US012717321B2

(12) United States Patent
Ko

(10) Patent No.: US 12,717,321 B2
(45) Date of Patent: Aug. 25, 2026

(54) VEHICLE CONSUMABLES MANAGEMENT SYSTEM AND METHOD

(71) Applicant: HL KLEMOVE CORP., Incheon (KR)

(72) Inventor: Soohyun Ko, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 700 days.

(21) Appl. No.: 17/964,828

(22) Filed: Oct. 12, 2022

(65) Prior Publication Data

US 2023/0116159 A1 Apr. 13, 2023

(30) Foreign Application Priority Data

Oct. 13, 2021 (KR) ........................ 10-2021-0136167
Apr. 21, 2022 (KR) ........................ 10-2022-0049262

(51) Int. Cl.

*F16D 65/04* (2006.01)
*B60C 11/24* (2006.01)
*B60C 23/06* (2006.01)
*F16D 66/00* (2006.01)
*G05B 23/02* (2006.01)

(52) U.S. Cl.

CPC ........ *G05B 23/0283* (2013.01); *B60C 11/246* (2013.01); *B60C 23/061* (2013.01); (Continued)

(58) Field of Classification Search

CPC ............ G05B 23/0283; G05B 23/0224; B60C 11/246; B60C 23/061; F16D 65/04; (Continued)

(56) References Cited

U.S. PATENT DOCUMENTS

2008/0236269 A1* 10/2008 Howell ................. B60T 17/221 73/121
2014/0114558 A1* 4/2014 Singh .................. G01G 19/086 701/1

(Continued)

FOREIGN PATENT DOCUMENTS

JP 2004-67009 3/2004
JP 2005-67508 3/2005

(Continued)

OTHER PUBLICATIONS

Office Action dated Oct. 27, 2024 for Korean Patent Application No. 10-2022-0049262 and its English translation by Google translate.

(Continued)

*Primary Examiner* — Scott A Browne
*Assistant Examiner* — Izcalli Rios-Aguirre
(74) *Attorney, Agent, or Firm* — WOMBLE BOND DICKINSON (US) LLP

(57) ABSTRACT

A vehicle consumables management system includes a consumables remaining amount calculation unit receiving vehicle data including a brake pedal input signal, an outdoor temperature, a driving distance, a wheel velocity, and a wheel speed such as a wheel RPM, and calculating a remaining amount of a tire tread based on the driving distance and the wheel speed, and/or calculating a remaining amount of a brake pad based on at least one of the brake pedal input signal and vehicle acceleration and/or deceleration information, thereby being capable of accurately detecting the remaining amount of the tire tread of the vehicle without assistance of separate inspection equipment, and accurately predicting a wear amount and a remaining amount of the brake pad of the vehicle without additional expensive equipment.

6 Claims, 23 Drawing Sheets

(52) U.S. Cl.
CPC ............. *F16D 65/04* (2013.01); *F16D 66/00* (2013.01); *G05B 23/0224* (2013.01); *F16D 2066/001* (2013.01); *F16D 2066/005* (2013.01); *F16D 2066/006* (2013.01)

(58) Field of Classification Search
CPC ............... F16D 66/00; F16D 2066/001; F16D 2066/005; F16D 2066/006
See application file for complete search history.

(56) References Cited

U.S. PATENT DOCUMENTS

| | | | | |
|---|---|---|---|---|
| 2017/0023441 | A1* | 1/2017 | Luk | B60C 23/04 |
| 2017/0113494 | A1* | 4/2017 | Singh | B60C 23/0486 |
| 2019/0084548 | A1* | 3/2019 | Ohazulike | F16D 66/00 |
| 2019/0100197 | A1* | 4/2019 | Saiki | B60Q 9/008 |

FOREIGN PATENT DOCUMENTS

| | | |
|---|---|---|
| JP | 2021-172280 | 11/2021 |
| KR | 10-2019-0105213 | 9/2019 |
| KR | 10-2021-0040218 | 4/2021 |

OTHER PUBLICATIONS

Office Action dated Mar. 4, 2025 for Korean Patent Application No. 10-2021-0136167 and its English translation provided by Applicant's foreign counsel.

* cited by examiner

FIG. 4

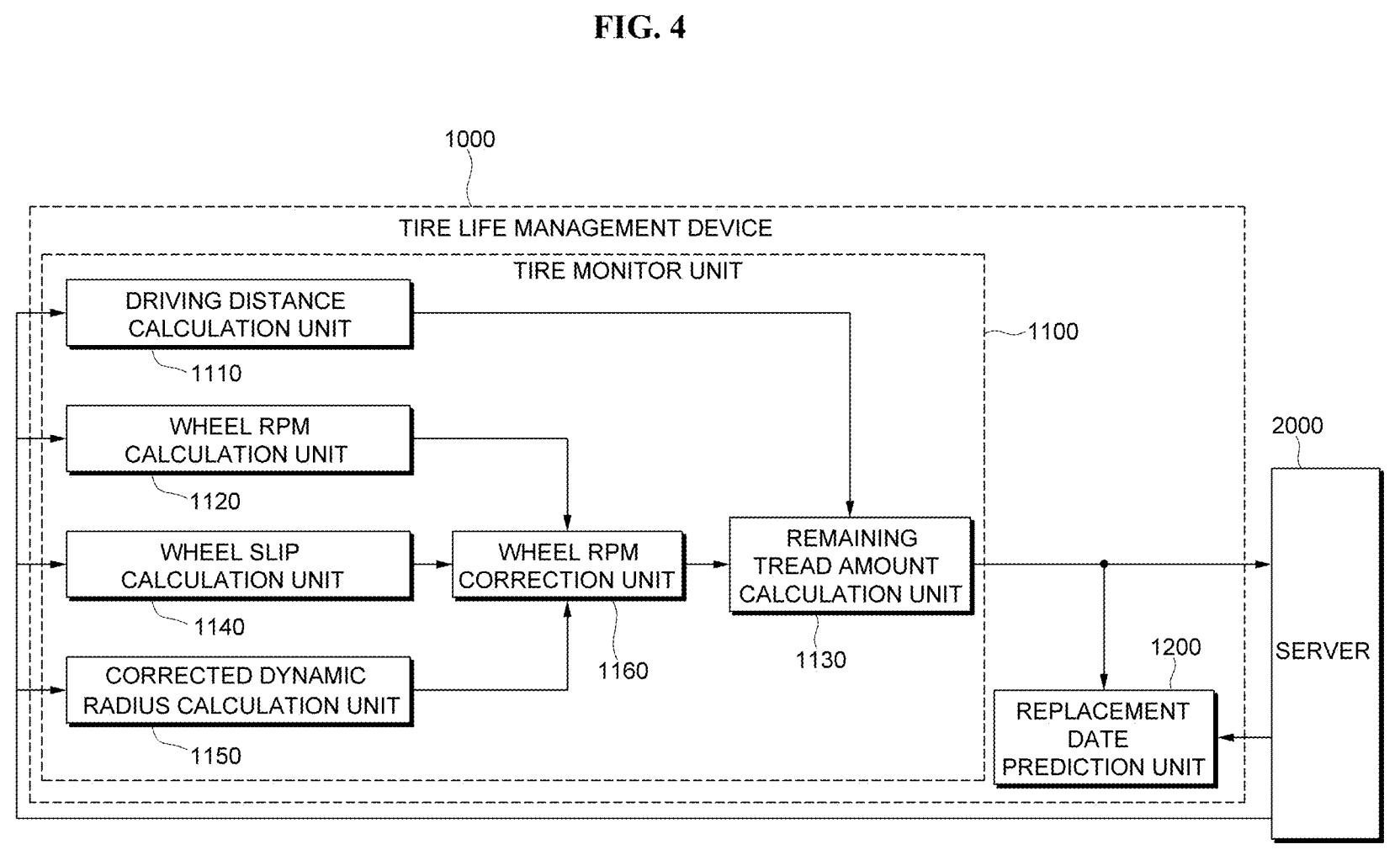

1000 TIRE LIFE MANAGEMENT DEVICE

1100 TIRE MONITOR UNIT

1110 DRIVING DISTANCE CALCULATION UNIT

1120 WHEEL RPM CALCULATION UNIT

1140 WHEEL SLIP CALCULATION UNIT

1150 CORRECTED DYNAMIC RADIUS CALCULATION UNIT

1160 WHEEL RPM CORRECTION UNIT

1130 REMAINING TREAD AMOUNT CALCULATION UNIT

1200 REPLACEMENT DATE PREDICTION UNIT

2000 SERVER

| LUT | M1 | M2 | M3 | M4 | M5 |
|---|---|---|---|---|---|
| T1 | CR11 | CR12 | CR13 | CR14 | CR15 |
| T2 | CR21 | CR22 | CR23 | CR24 | CR25 |
| T3 | CR31 | CR32 | CR33 | CR34 | CR35 |
| T4 | CR41 | CR42 | CR43 | CR44 | CR45 |
| T5 | CR51 | CR52 | CR53 | CR54 | CR55 |

| LUT | E1 | E2 | E3 | E4 | E5 |
|---|---|---|---|---|---|
| T1 | W11 | W12 | W13 | W14 | W15 |
| T2 | W21 | W22 | W23 | W24 | W25 |
| T3 | W31 | W32 | W33 | W34 | W35 |
| T4 | W41 | W42 | W43 | W44 | W45 |
| T5 | W51 | W52 | W53 | W54 | W55 |

VEHICLE CONSUMABLES MANAGEMENT SYSTEM AND METHOD

CROSS-REFERENCE TO RELATED APPLICATIONS

This application claims benefit and priority to Korean Patent Application Nos. 10-2021-0136167 filed on Oct. 13, 2021 and 10-2022-0049262 filed on Apr. 21, 2022, with the Korean Intellectual Property Office, the disclosure of which is incorporated herein in its entirety by reference.

TECHNICAL FIELD

The present disclosure generally relates to a vehicle consumables management system and method, and particularly, to a vehicle consumables management system and method which can accurately detect a remaining amount of a tire tread of a vehicle without separate inspection equipment, and can accurately predict a wear amount and a remaining amount of a brake pad of the vehicle without additional expensive equipment.

BACKGROUND

A tire of a vehicle can be worn through friction with a road surface. Excessive wear of the tire may cause occurrence of an accident due to a reduced braking capacity, cornering instability, hydroplaning, etc., and the caused accident can lead to a large accident.

A wear amount of the tire of the vehicle can be determined through a remaining amount (or wearing amount) of the tread formed on the outer circumferential surface of the tire.

In general, the wear amount of the tire tread can be checked through vision and acoustic inspections using visual inspection or separate equipment.

However, the visual inspection cannot accurately detect the wear amount of the tire tread and may be cumbersome. And the inspection using the separate equipment can accurately detect the wear amount, but extra cost and time are required.

SUMMARY

The present disclosure has been made in an effort to provide a vehicle consumables management system which can accurately detect a remaining amount of a tire tread of a vehicle without separate inspection equipment based on vehicle data, and can accurately predict a wear amount and/or a remaining amount of a brake pad of the vehicle without additional expensive equipment.

An exemplary embodiment of the present disclosure provides a vehicle consumables management system including a consumables remaining amount calculation unit receiving vehicle data including a brake pedal input signal, an outdoor temperature, a driving distance, a wheel velocity, and a wheel RPM, and calculating a tread remaining amount of a tire based on the driving distance and the wheel RPM, and/or calculating a brake pad remaining amount based on at least one of the brake pedal input signal and vehicle acceleration/deceleration information.

The consumables remaining amount calculation unit calculates a dynamic radius of the tire based on the ratio between the driving distance and the wheel RPM, and calculates the remaining tread amount based on the calculated dynamic radius.

The tire monitor unit calculates the remaining tread amount based on a ratio of the driving distance to the wheel RPM or a ratio of the wheel RPM to the driving distance.

The tire monitor unit includes a driving distance calculation unit calculating the driving distance based on positional data of the vehicle, a wheel RPM calculation unit calculating the wheel RPM based on a wheel pulse of the vehicle, and a remaining tread amount calculation unit calculating the remaining tread amount based on the driving distance from the driving distance calculation unit and the wheel RPM from the wheel RPM calculation unit.

The tire monitor unit further includes a wheel RPM correction unit correcting the wheel speed (e.g. the wheel RPM) from the wheel RPM calculation unit based on predetermined corrected data, and providing the corrected wheel speed (e.g. the corrected wheel RPM) to the remaining tread amount calculation unit.

The predetermined corrected data may include a wheel slip rate and a corrected dynamic radius of the tire.

The tire monitor unit further includes a wheel slip calculation unit calculating the wheel slip rate based on a wheel speed of the vehicle, and a dynamic radius correction unit calculating the corrected dynamic radius based on a weight of the vehicle.

The dynamic radius correction unit includes a look-up table storing a corrected dynamic radius predetermined according to the weight of the vehicle.

The driving distance calculation unit calculates the driving distance based on the positional data, and an Internet map.

The consumables remaining amount calculation unit further includes a replacement date prediction unit calculating an expected replacement date of the tire based on tire replacement history information and the remaining tread amount from the tire monitor unit.

The vehicle data further includes a rain sensor signal of the vehicle, the acceleration/deceleration information includes an acceleration and a cylinder pressure of the vehicle, and the consumables remaining amount calculation unit includes a brake pad monitoring apparatus calculating the brake pad remaining amount, and the brake pad monitoring apparatus includes a feature extraction unit extracting feature data including braking energy of the vehicle based on the vehicle data, a pad temperature prediction unit predicting the temperature of the brake pad by analyzing the feature data from the feature extraction unit in an artificial intelligence scheme, a pad wear amount calculation unit calculating a wear amount of the brake pad based on the temperature of the brake pad from the pad temperature prediction unit and the braking energy from the feature extraction unit, and a pad remaining amount calculation unit calculating the remaining amount of the brake pad based on the wear amount of the brake pad from the pad wear amount calculation unit.

The feature extraction unit includes a source storage unit storing the vehicle data, and a data extraction unit extracting the feature data from the vehicle data of the source storage unit.

The pad temperature prediction unit includes a setting value storage unit pre-storing a model setting value calculated by the machine learning of the artificial intelligence scheme to infer the temperature of the brake pad corresponding to the vehicle data, and a pad temperature calculation unit calculating the temperature of the brake pad based on the feature data from the feature extraction unit and the model setting value from the setting value storage unit.

The pad wear amount calculation unit includes a look-up table storing a value of the wear amount of the brake pad predetermined according to a value of the temperature of the brake pad and a value of the braking energy, and a pad wear amount output unit searching the wear amount of the brake pad from the look-up table based on the temperature of the brake pad from the pad temperature prediction unit and the braking energy from the feature extraction unit, and outputting the searched wear amount of the brake pad.

The pad remaining amount calculation unit outputs the remaining amount of the brake pad by subtracting the brake wear amount from the pad wear amount calculation unit from a current thickness of the brake pad.

The data extraction unit includes an interval classification unit classifying the vehicle data of the source storage unit for each of the braking interval and the non-braking interval of the vehicle, an interval length calculation unit calculating a length of the braking interval and the length of the non-braking interval based on the vehicle data from the interval classification unit, a cylinder pressure calculation unit calculating the pressure for each interval of the cylinder for providing the braking force of the vehicle based on the vehicle data from the interval classification unit, a vehicle velocity calculation unit calculating a vehicle velocity for each interval based on the vehicle data from the interval classification unit, a braking energy calculation unit calculating braking energy for each interval based on the vehicle data from the interval classification unit, an outdoor temperature calculation unit calculating an outdoor temperature for each interval based on the vehicle data from the interval classification unit, and a quantity calculation unit calculating a quantity for each interval based on the vehicle data from the interval classification unit.

The pad temperature calculation unit includes an initial temperature calculation unit calculating an initial temperature of the brake pad based on the feature data from the feature extraction unit, a data collection unit collecting and outputting the feature data from the feature extraction unit the initial temperature from the initial temperature calculation unit as one data set, a normalization unit normalizing the data set from the data collection unit based on the average and the standard deviation of the vehicle data provided from the setting value storage unit, a model generation unit generating a pad temperature prediction model based on a weight and a bias of the vehicle data loaded from the setting value storage unit, a setting value loading unit loading the weight and the bias of the vehicle data from the setting value storage unit to the model generation unit, and a prediction value output unit calculating the temperature change rate of the brake pad by inputting the data set normalized from the normalization unit into the pad temperature prediction model from the model generation unit, calculating the temperature of the brake pad by adding the initial temperature to the calculated temperature change rate, and outputting the calculated brake pad temperature.

The initial temperature is set based on a time length from a time when the start of the vehicle is turned off up to a time when the start of the vehicle starts, the outdoor temperature of the vehicle, and a value defined by a predetermined brake pad temperature characteristic curve.

The data set is classified into a data set of the braking interval of the vehicle and a data set of the non-braking interval of the vehicle, and the prediction value output unit outputs a pad temperature predicted at the end time of the interval as the brake pad temperature of the interval.

The prediction value output unit calculates the brake pad temperature in a predetermined period by summing up all brake pad temperatures of a non-braking interval and a braking interval included in the predetermined period.

According to some exemplary embodiments of the present disclosure, a vehicle consumables management system can accurately calculate a remaining amount of a tread of a tire only by analysis of vehicle data. Therefore, a wear amount of the tire can be easily determined without separate equipment for checking the wearing of the tire tread.

Further, according to certain exemplary embodiments of the present disclosure, a vehicle consumables management system can reduce an accident risk caused by delaying in replacing the tire by calculating an expected replacement date of the tire and notifying the calculated expected replacement date to a driver or user based on the calculated remaining amount of the tire tread.

Further, according to some exemplary embodiments of the present disclosure, in order to exclude a change amount of a wheel speed (e.g. a wheel RPM) according to interference of other factors in addition to a wear amount of a tire tread at the time of calculating the wheel speed (e.g. the wheel RPM), an original wheel speed (e.g. an original wheel RPM) is corrected based on predetermined correction data to accurately calculate the wear amount of the tire.

In addition, a vehicle consumables management system according to certain exemplary embodiments of the present disclosure can analyze vehicle data (e.g., CAN data of the vehicle) by an artificial intelligence scheme and accurately predict a wear amount of a brake pad through a model by machine learning.

Therefore, a vehicle consumables management system according to some exemplary embodiments of the present disclosure can estimate or determine a remaining amount of the brake pad accurately and quickly. As a result, since the vehicle consumables management device and method according to certain exemplary embodiments of the present disclosure do not require expensive equipment, the manufacturing cost can be reduced in checking the remaining amount of the brake pad.

A vehicle consumables management system according to certain exemplary embodiments of the present disclosure can be applied to a fleet vehicle system such as a rental car, a taxi and a shared vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 4 is a detailed block diagram of a tire life management device of FIG. 1 according to another exemplary embodiment of the present disclosure.

DETAILED DESCRIPTION

Figure 1:
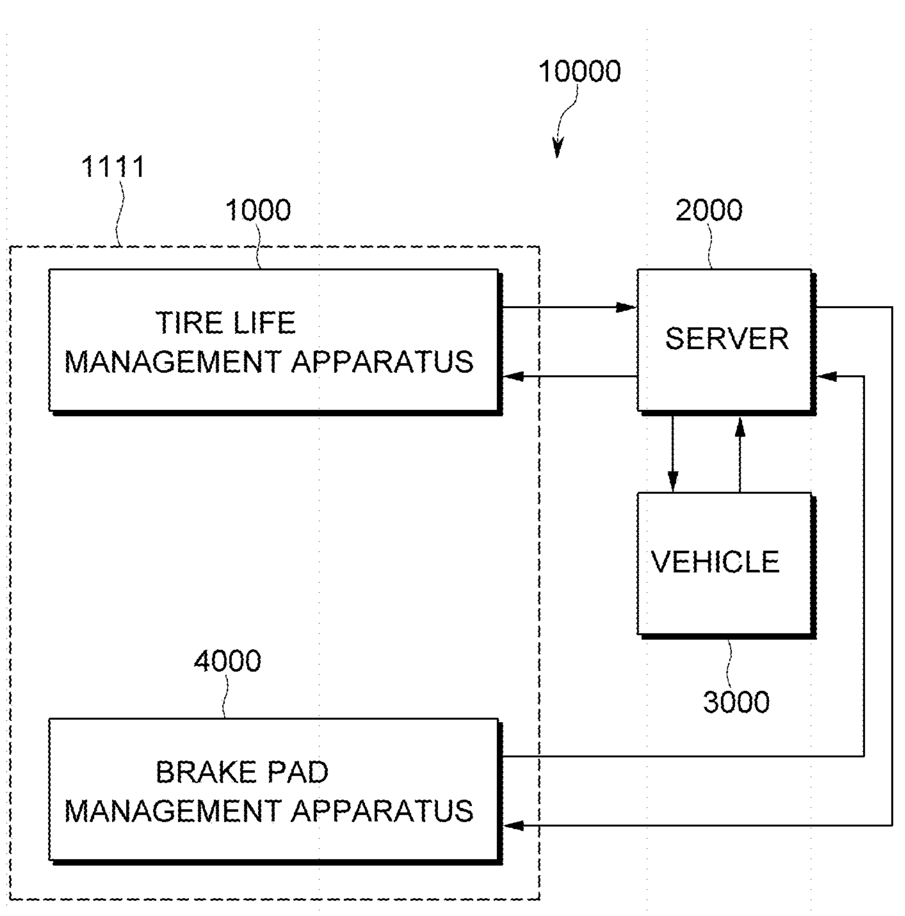
FIG. 1 is a block diagram of a vehicle consumables management system according to an exemplary embodiment of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Advantages and features of the present disclosure, and methods for accomplishing the same will be more clearly understood from embodiments described in detail below with reference to the accompanying drawings. However, the present disclosure is not limited to the following embodiments but may be implemented in various different forms. The embodiments are provided only to make description of the present disclosure complete and to fully provide the scope of the present disclosure to a person having ordinary skill in the art to which the present disclosure pertains, and the present disclosure will be just defined by the appended claims. Thus, in some exemplary embodiments, well-known process steps, well-known device structures and well-known technologies are not specifically described to avoid the ambiguity of the present disclosure. Throughout the whole specification, the same reference numerals denote the same elements.

In the drawings, the thickness of various layers and regions are exaggerated for clarity. Throughout the specification, like reference numerals refer to like elements.

In this specification, terms including as first, second, third, and the like are used for describing various constituent elements, but the constituent elements are not limited by the terms. The terms are used only for distinguishing one component from the other component. For example, a first component may be named as a second component or a third component and similarly, the second component or the third component may also be interchangeably named as the first component without departing from the scope of the present disclosure.

In the present specification, the singular form also includes the plural form, unless the context indicates otherwise.

In the present specification, the term 'and/or' indicates respective listed components or various combinations thereof.

Unless otherwise defined, all terms (including technical and scientific terms) used in the present specification may be used as the meaning which may be commonly understood by the person with ordinary skill in the art, to which the present disclosure pertains. Terms defined in commonly used dictionaries should not be interpreted in an idealized or excessive sense unless expressly and specifically defined.

Hereinafter, a vehicle consumables management system according to the present disclosure will be described in detail as follows with reference to FIGS. 1 to 26.

FIG. 1 is a block diagram of a vehicle consumables management system according to an exemplary embodiment of the present disclosure.

A vehicle consumables management system 10000 according to an exemplary embodiment of the present disclosure may include a consumables remaining amount calculation unit 1111, a server 2000, and a vehicle 3000. The consumables remaining amount calculation unit 1111 is configured to calculate at least one of a tread remaining amount of a tire and a remaining amount of a brake pad. The consumables remaining amount calculation unit 1111 of the vehicle consumables management system 10000 may include, for example, a tire life management apparatus 1000 illustrated in FIG. 1 and a brake pad monitoring apparatus 4000 illustrated in FIG. 9.

Here, exemplary embodiments of the tire life management apparatus 1000 of the consumables remaining amount calculation unit 1111 will be described in detail as follows with reference to FIGS. 1 to 8.

Hereinafter, a brake pad monitoring device of a vehicle and a method thereof according to the present disclosure will be described in detail as follows with reference to FIGS. 1 to 8.

FIG. 1 is a block diagram of a tire life management device 1000 and related peripheral components according to an exemplary embodiment of the present disclosure.

As illustrated in FIG. 1, the vehicle 3000 may transmit vehicle data to the server 2000 through a communication device included in or connected to the vehicle 3000. Then, the server 2000 may store the vehicle data transmitted from the vehicle 3000.

The tire life management device 1000 according to an exemplary embodiment of the present disclosure may be configured to calculate (or estimate, predict or infer) a life of a tire of the vehicle 3000 by analyzing the vehicle data provided from the server 2000. Here, the life of the tire may be calculated based on, for example, but not limited to, a remaining amount (or a wear amount) of a tread of the tire. Here, the vehicle data may include, for example, but not limited to, a wheel speed, a wheel pulse, a tire pressure, a drivetrain signal (e.g., an engine displacement of the vehicle 3000 and a transmission type of the vehicle 3000) and positional data (or location data).

When the vehicle 3000 includes a plurality of tires, the tire life management device 1000 may calculate the life for each of the plurality of tires individually. As one example, when the vehicle 3000 includes four tires (e.g., a front left tire, a front right tire, a rear left tire, and a rear right tire) mounted on four wheels, respectively, the tire life management device 1000 may calculate the life of the front left tire, the life of the front right tire, the life of the rear left tire, and the life of the rear right tire individually. Alternatively, the tire life management device 1000 may also selectively calculate the life of some tires, for example, the life only for m (m is a natural number smaller than 1) tires among n (n is a natural number larger than m) tires.

Further, the tire life management device 1000 may calculate (or estimate or predict or infer) an expected replacement date of the tire based on the remaining amount of the tread of the tire, for example. As another exemplary embodiment, the tire life management device 1000 may further receive replacement history information of the tire from the server 2000, and more accurately calculate (or estimate or predict or infer) the expected replacement date of the tire based on the replacement history information and the remaining tread amount for the tire.

The tire life management device 1000 may transmit or provide the calculated life and expected replacement date of the tire to the server 2000. In this case, the tire life management device 1000 may periodically calculate the life and the expected replacement date of the tire, and periodically transmit or provide the calculated life and the expected replacement date of the tire to the server 2000.

Meanwhile, when the calculated life of the tire is lower than a predetermined threshold, the tire life management device 1000 may further transmit alarm or warning data to the server 2000 together with the life (e.g., the remaining life) and expected replacement date of the tire.

The server 2000 may transmit or provide data (e.g., at least one of the remaining tread amount of the tire, the expected replacement date of the tire, and the alarm data) transmitted from the tire life management device 1000 to a corresponding vehicle.

Figure 2:
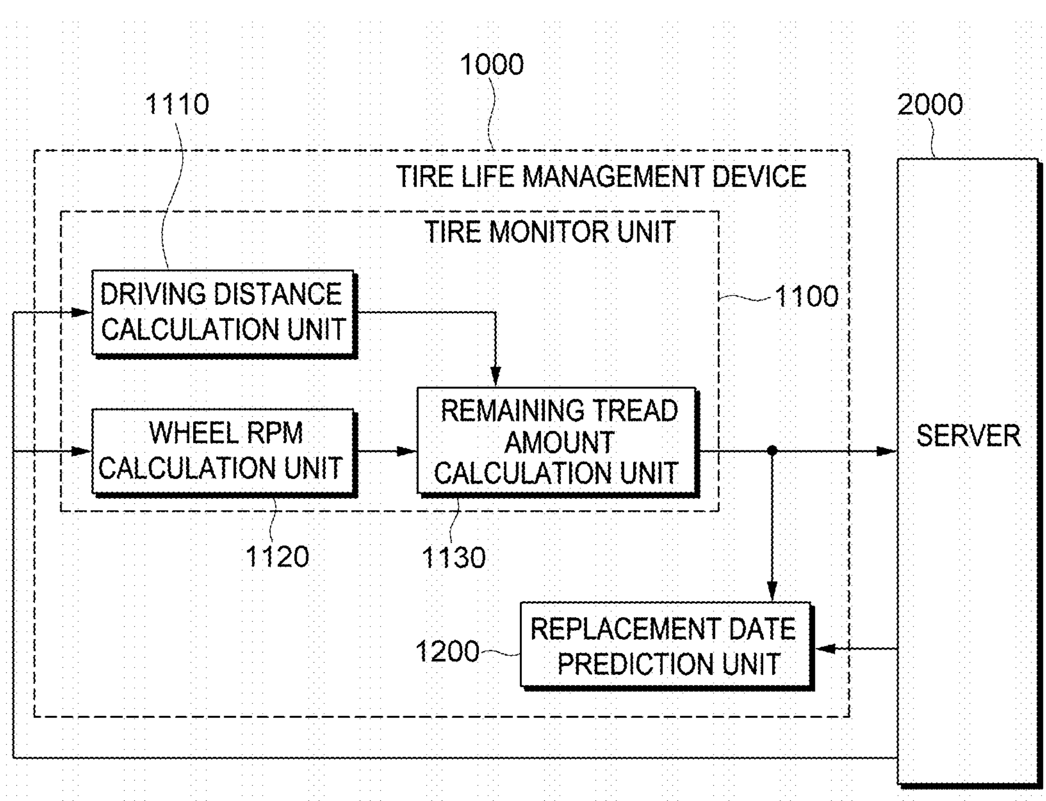
FIG. 2 is a detailed block diagram of a tire life management device of FIG. 1 according to an exemplary embodiment of the present disclosure.
Figure 3A:
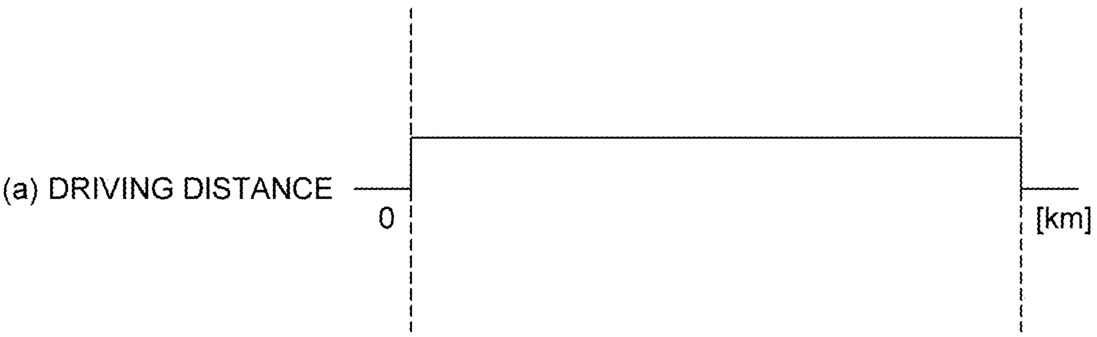
FIGS. 3A and 3B are graphs for describing a change of a wheel speed per driving distance according to a remaining amount of a tire tread a vehicle.
Figure 3B:
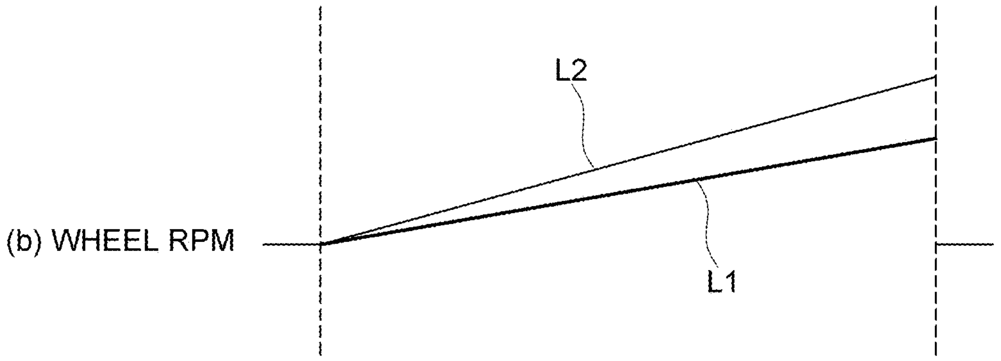

FIG. 2 is a block diagram of a tire life management device according to an exemplary embodiment of the present disclosure, and FIGS. 3A and 3B are graphs for describing a change of a wheel Revolution Per Minute (RPM) per driving distance according to a remaining tread amount of the vehicle 3000. Here, RPM may be an example of a wheel speed. The wheel speed may be a speed of a wheel, for example, but not limited to, a rotational speed of a wheel, a frequency of rotation of a wheel, a number of turns of a wheel in a certain time period (such as RPM), and the like.

The tire life management device 1000 according to the present disclosure may include a tire monitor unit 1100 and a replacement date prediction unit 1200 as in the exemplary embodiment illustrated in FIG. 2.

The tire monitor unit 1100 may be configured to calculate the remaining tread amount of the tire of the vehicle 3000 based on a ratio between a driving distance of the vehicle 3000 (or a movement distance of the vehicle 3000) and a wheel speed (e.g. a wheel RPM) of the vehicle 3000. For example, the tire monitor unit 1100 may also calculate the remaining tread amount based on a ratio of the driving distance to the wheel speed (e.g. the wheel RPM). As another example, the tire monitor unit 1100 may also calculate the remaining tread amount based on a ratio of the wheel speed (e.g. the wheel RPM) to the driving distance. The driving distance may be a distance in which the vehicle 300 has been driven.

The tire monitor unit 1100 may calculate a dynamic radius of the tire based on the ratio between the driving distance and the wheel speed or RPM (e.g., the driving distance/the wheel RPM or the wheel RPM/the driving distance), and calculate the remaining tread amount of based on the calculated dynamic radius. Here, the dynamic radius may be calculated using Equation 1 below.

$$DR = \text{driving distance}/(2*\pi*\text{wheel RPM}) \quad \text{<Equation 1>}$$

In Equation 1 above, DR represents the dynamic radius of the tire and π means a circumference ratio.

Meanwhile, a factor affecting not only the tread wear amount of the tire but also a size of the dynamic radius of the tire may further include a wheel slip rate of the vehicle 3000, a weight of the vehicle 3000, the weight of the tire, a pressure of the tire, a temperature of the tire, etc. Here, when the values or sizes of other factors other than the tread wear amount are equal to each other, it may be regarded that a change of the dynamic radius of the vehicle 3000 is affected only by the tread wear amount.

As time elapsed, the wear amount of the tread of the tire is accumulated, and as a result, the remaining tread amount of the tire is continuously reduced. As a result, the radius (e.g., dynamic radius) of the tire decreases, and the driving distance per wheel speed (e.g. RPM), i.e., the size of the dynamic radius decreases. In other words, as the remaining tread amount of the tire decreases, the wheel RPM per driving distance increases, so this is described as below with reference to FIG. 3.

FIG. 3A illustrates an example of a daily driving distance (or a daily average driving distance) of the vehicle 3000.

FIG. 3B illustrates examples of a first line L1 and a second line L2 having different slopes. The first line L1 having a relatively lower slope indicates a change amount of the wheel RPM according to the elapse of the time for a tire (e.g., a new tire which is not worn at all) with a remaining tread amount of first 100% and the second line L2 having a relatively higher slope indicates the change amount of the wheel RPM according to the elapse of the time for a tire having a remaining tread amount (e.g., a remaining tread amount of 20% based on the remaining tread amount of 100%) of first 20%. Here, the first straight line L1 and the second straight line L2 illustrated in FIG. 3B indicate change rates of the wheel RPM per driving distance of FIG. 3A. Further, the tire having the remaining tread amount of 100% and the tire having the remaining tread amount of 20% are tested in a state in which all remaining conditions (e.g., a tire specification, a tire temperature, a tire pressure, etc.,) other than the remaining tread amount are the same.

As illustrated in FIG. 3, as the remaining tread amount decreases, the wheel RPM increases. In other words, as the remaining tread amount decreases, the radius of the tire decreases, and as a result, the RPM (e.g., wheel RPM) of the tire for moving a predetermined driving distance also increases.

The tire monitor unit 1100 may periodically predict the remaining tread amount of the tire by detecting a change (e.g., a change rate of the dynamic radius) in ratio between the driving distance of the vehicle 3000 and the wheel RPM through Equation 1. Consequently, the size of the dynamic radius may correspond to the remaining tread amount.

Further, the tire monitor unit 1100 compares the calculated remaining tread amount of the tire with a predetermined threshold, and as a comparison result, when the calculated remaining tread amount of the tire is smaller than the threshold, the tire monitor unit 1100 may further generate the alarm data. The alarm data may include at least one of visual contents and auditory contents for informing that a tread wear level of the tire reaches a risk level.

As illustrated in the exemplary embodiment of FIG. 2, the tire monitor unit 1100 according to an exemplary embodiment of the present disclosure may include a driving distance calculation unit 1110, a wheel RPM calculation unit 1120, and a remaining tread amount calculation unit 1130.

The driving distance calculation unit 1110 may calculate the driving distance of the vehicle 3000 based on the positional data of the vehicle 3000 (e.g. information on a position or location of the vehicle 3000). For example, the positional data of the vehicle 3000 may be acquired from a terminal installed in or associated with the vehicle 3000.

As an example, the terminal may include an inertial measurement device (for instance, an inertial sensor) and a satellite positioning system (for example, a global navigation satellite system (GNSS)), so the terminal may provide, to the server 2000, the positional data of the vehicle 3000 generated by at least one of the inertial measurement device and the satellite positioning system or a combination thereof, and the server 2000 may provide the positional data to the driving distance calculation unit 1110. As such, the driving distance calculation unit 1110 may determine the driving distance of the vehicle 3000 based on the positional data (e.g., GNSS data) generated by at least one of the inertial measurement device of the vehicle 3000 and the satellite positioning system of the vehicle 3000 or the combination thereof. Here, for example, the GNSS data may include global positioning system (GPS) data.

Meanwhile, the driving distance calculation unit 1110 may more precisely calculate the driving distance by utilizing map data including, for example, but not limited to, an Internet map (e.g., an Internet map such as Google map, Naver map, any map provided by an internet service provider, etc.) produced based on a distance matrix application programming interface (API) and map stored in memory. For example, the driving distance calculation unit 1110 may correct the positional data (e.g., GNSS data) generated based on the satellite positioning system by utilizing the Internet map, and calculate a more accurate driving distance of the vehicle 3000 based on the corrected positional data. Unlike this, the terminal of the vehicle 3000 may also precisely correct the positional data (e.g., GNSS data) through the Internet map, and then provide the corrected positional data (e.g., corrected GNSS data) to the server 2000. In such a case, the driving distance calculation unit 1110 receives the corrected positional data from the server 2000 to calculate the driving distance of the vehicle 3000. As another exemplary embodiment, a correction task of the positional data utilizing the Internet map may also be performed by the server 2000 instead of the terminal or the driving distance calculation unit 1110, for example.

The wheel speed calculation unit or wheel RPM calculation unit 1120 may calculate the wheel speed of the vehicle 3000, such as the wheel RPM of the vehicle 3000, based on a wheel pulse of the vehicle 3000. Meanwhile, the wheel RPM calculation unit 1120 may calculate the wheel speed of each wheel, for example, but not limited to, the RPM of each wheel. As an example, when the vehicle 3000 includes a front left wheel mounted with a front left tire, a front right wheel mounted with a front right tire, a rear left wheel mounted with a rear left tire, and a rear right wheel mounted with a rear right tire, the wheel RPM calculation unit 1120 may individually calculate each of the wheel speed (e.g. the RPM) of the front left wheel, the wheel speed (e.g. the RPM) of the front right wheel, the wheel speed (e.g. the RPM) of the rear left wheel, and the wheel speed (e.g. the RPM) of the rear right wheel. Alternatively, the wheel RPM calculation unit 1120 may also selectively calculate one or more wheel speeds (wheel RPMs) only for some wheels (e.g. m wheels among n wheels).

Meanwhile, the driving distance from the driving distance calculation unit 1110 and the wheel RPM from the wheel RPM calculation unit 1120 may be calculated based on data (e.g., the positional data and the wheel pulse) extracted in the same time interval (an interval between the same time stamps).

The remaining tread amount calculation unit 1130 may calculate the remaining tread amount of the tire based on the driving distance from the driving distance calculation unit 1110 and the wheel speed (e.g. the wheel RPM) from the wheel RPM calculation unit 1120. For example, the remaining tread amount calculation unit 1130 may calculate the dynamic radius of the tire by substituting the calculated driving distance and the wheel speed (e.g. the wheel RPM) into the Equation 1 described above, and calculate the remaining tread amount of the tire based on the calculated dynamic radius. For example, when the vehicle 3000 includes the front left tire, the front right tire, the rear left tire, and the rear right tire described above, the remaining tread amount calculation unit 1130 may individually calculate the remaining tread amount of the front left tire, the remaining tread amount of the front right tire, the remaining tread amount of the rear left tire, and the remaining tread amount of the rear right tire. Alternatively, the remaining tread amount calculation unit 1130 may also selectively calculate the remaining tread amount only for some tires (e.g. m tires among n tires).

The remaining tread amount calculation unit 1130 may transmit the calculated remaining tread amount of the tire to the server 2000 and a replacement date prediction unit 1200. In this exemplary embodiment, the remaining tread amount calculation unit 1130 may provide, to the server 2000, a value (e.g., a dynamic radius of the tire) calculated through Equation 1 as the remaining tread amount as it is, and unlike this, the remaining tread amount calculation unit 1130 may also find or retrieve the remaining tread amount corresponding to the size of the dynamic radius calculated through Equation 1 from a predetermined look-up table stored in memory, and provide the remaining tread amount to the server 2000. The look-up table may store predetermined remaining tread amounts having various sizes according to dynamic radius having various sizes.

Further, the remaining tread amount calculation unit 1130 compares the calculated remaining tread amount with a threshold, and, when the calculated remaining tread amount is smaller than the threshold as the comparison result, the remaining tread amount calculation unit 1130 may further generate the alarm data. The threshold may include a plurality of thresholds having different levels or sizes. For example, the threshold may include a first threshold which is set as a lowest value, a third threshold which is set as a highest value, and a second threshold set between the first threshold and the third threshold. In this case, the remaining tread amount calculation unit 1130 may provide different types of alarm data depending on a threshold interval in which the calculated remaining tread amount is located. For example, when the calculated remaining tread amount is smaller than the third threshold and equal to or larger than the second threshold, the remaining tread amount calculation unit 1130 may transmit, to the server 2000, first alarm data (e.g., alarm data which allows an alarm message to be displayed with a blue color on a display of the vehicle 3000) of a first step together with the calculated remaining tread amount of the tire. When the calculated remaining tread amount is smaller than the second threshold and equal to or larger than the first threshold, the remaining tread amount calculation unit 1130 may transmit, to the server 2000, second alarm data (e.g., alarm data which allows an alarm message to be displayed with a yellow color on a display of the vehicle 3000) of a second step together with the calculated remaining tread amount of the tire. When the calculated remaining tread amount is smaller than the first threshold, the remaining tread amount calculation unit 1130 may transmit, to the server 2000, third alarm data (e.g., alarm data which allows an alarm message to be displayed with a red color on a display of the vehicle 3000) of a third step together with the calculated remaining tread amount of the tire.

The replacement date prediction unit 1200 may calculate (or estimate or predict or infer) the expected replacement date of the tire based on the remaining amount of the tread of the tire calculated from the remaining tread amount calculation unit 1130. As another exemplary embodiment, the replacement date prediction unit 1200 may further receive replacement history information of the tire from the server 2000, and more accurately calculate the expected replacement date of the tire based on the replacement history information and the remaining tread amount for the tire. Meanwhile, the replacement date prediction unit 1200 may further receive information on a specification of the tire from the server 2000. The information on the tire specification may include, for example, but not limited to, the size of the tire, the type of the tire (e.g., a snow tire), a manufacturer of the tire, etc.

Meanwhile, the vehicle 3000 may include a rental car, a taxi, and a sharing vehicle, and the server 2000 may be a server of a fleet vehicle company which services such a rental car, the taxi, and the sharing vehicle.

Figure 5:
FIG. 5 is a diagram for illustrating an example of a look-up table storing a corrected dynamic radius.

FIG. 4 is a block diagram of the tire life management device 1000 of FIG. 1 according to another exemplary embodiment, and FIG. 5 is an example of a look-up table storing a corrected dynamic radius according to an embodiment of the present disclosure.

The tire life management device 1000 according to another exemplary embodiment of the present disclosure may include the tire monitor unit 1100 and the replacement date prediction unit 1200 as illustrated in FIG. 4.

The tire monitor unit 1100 may include the driving distance calculation unit 1110, the wheel speed calculation unit or wheel RPM calculation unit 1120, a wheel slip calculation unit 1140, a corrected dynamics radius calculation unit 1150, a wheel speed correction unit or wheel RPM correction unit 1160, and the remaining tread amount calculation unit 1130. In other words, the tire life management device of FIG. 4 may further include the wheel slip calculation unit 1140, the corrected dynamic radius calculation unit 1150, and the wheel RPM correction unit 1160 as compared with the tire life management device 1000 of FIG. 2.

Since the driving distance calculation unit 1110, the wheel RPM calculation unit 1120, and the remaining tread amount calculation unit 1130 of FIG. 4 are the same as, or similar with, the driving distance calculation unit 1110, the wheel RPM calculation unit 1120, and the remaining tread amount calculation unit 1130 of FIG. 2, respectively, the driving distance calculation unit 1110, the wheel RPM calculation unit 1120 and the remaining tread amount calculation unit 1130 of FIG. 4 are described with reference to FIG. 2 and related contents.

The wheel slip calculation unit 1140 may calculate the slip rate of the wheel. For example, when the wheel slip occurs, the wheel speed (e.g. the RPM of the wheel) after the wheel slip occurs is smaller than the wheel speed (e.g. the wheel RPM) before the wheel slip occurs, so the wheel slip rate may be calculated based on the wheel speed. Meanwhile, when the vehicle 3000 includes the front left wheel, the front right wheel, the rear left wheel, and the rear right wheel described above, the wheel slip calculation unit 1140 selects a wheel which rotates at the highest (or the fastest) speed among four wheels described above, sets the speed of the selected wheel as a reference speed (e.g., a vehicle speed), and compares the reference speed with speeds of respective other wheels to calculate the slip rate of each wheel.

The corrected dynamic radius calculation unit 1150 may include a look-up table pre-storing a dynamic radius size change amount according to the weight of the vehicle 3000. For example, after a tolerance weight of the vehicle 3000 (e.g., a weight of only the vehicle not including a passenger) is set to a reference value, a size change rate of the dynamic radius according to the increase in weight of the vehicle 3000 from the reference value (e.g., a size reduction rate of the dynamic radius according to an increase in weight of the vehicle 3000 as compared with a reference weight) may be stored in the look-up table. As an example, the reduction rate of the dynamic radius according to a difference between a current measured weight of the vehicle 3000 and the reference value may be stored in the look-up table as a corrected dynamic radius.

Meanwhile, the corrected dynamic radius calculation unit 1150 may provide a predetermined size reduction rate of the dynamic radius of the tire according to, for example, the tire specification, the tire pressure, the tire temperature, and the drivetrain signal in addition to the weight of the vehicle 3000. As one example for this, the dynamic radius change rate according to the vehicle weight, the tire specification, the tire pressure, the tire temperature, and a power signal may be stored in the look-up table. An example of the look-up table is illustrated in FIG. 5. For example, a look-up table 310 of FIG. 5 may include a value of a corrected dynamic radius predetermined according to a value of the tire pressure and the weight of the vehicle. For example, as illustrated in FIG. 5, the look-up table 310 may include a plurality of corrected dynamic radius values (CR11, CR12, CR13, . . . , CR54, CR55) defined by a matrix combination of a plurality of tire pressure values (T1, T2, T3, T4, T5) and a plurality of vehicle weight values (M1, M2, M3, M4, M5).

The corrected dynamic radius calculation unit 1150 may retrieve a corrected dynamic radius value from the look-up table 310 based on the tire pressure and the vehicle weight (e.g., a current measured vehicle weight), and output the retrieved value as the corrected dynamic radius. For example, as illustrated in FIG. 5, when the tire pressure value is T3 and the vehicle weight value is M4, the corrected dynamic radius calculation unit 1150 may select and output CR34 as the corrected dynamic radius value. In other words, as a corrected dynamic radius value corresponding to the current measured tire pressure T3 and the current measured vehicle weight M4, CR34 may be retrieved and output.

Meanwhile, the driving distance from the driving distance calculation unit 1110, the wheel speed (e.g. the wheel RPM) from the wheel RPM calculation unit 1120, the wheel slip rate from the wheel slip calculation unit 1140, and the corrected dynamic radius from the corrected dynamic radius calculation unit 1150 may be all calculated based on data (e.g., the positional data, the wheel pulse, the wheel speed, and the vehicle weight) extracted in the same time interval (e.g., the interval between the same time stamps).

The wheel RPM correction unit 1160 may correct the wheel speed (e.g. the wheel RPM) from the wheel RPM calculation unit 1120 based on predetermined corrected data, and provide the corrected wheel speed (e.g. the corrected wheel RPM) to the remaining tread amount calculation unit 1130. Here, the predetermined corrected data may include, for example, the wheel slip rate and the corrected dynamic radius of the tire. When the corrected data includes the wheel slip rate and the corrected dynamic radius, the wheel RPM correction unit 1160 may correct an original wheel speed such as an original wheel RPM (e.g., the wheel RPM from the wheel RPM calculation unit 1120) based on the wheel slip rate from the wheel slip calculation unit 1140 and the corrected dynamic radius from the corrected dynamic radius calculation unit 1150. That is, factors which may affect the wheel speed (e.g. the wheel RPM) may include the tread wear amount of the tire, the wheel slip rate, the dynamic radius change by the vehicle weight, etc., as described above, so the wheel RPM correction unit 1160 may correct the original wheel speed such as the original wheel RPM (e.g., the wheel RPM measured based on the wheel pulse) based on the dynamic radius change rate according to the wheel slip rate and the vehicle weight change in order to exclude the change amount of the wheel speed (e.g. the wheel RPM) according to interference of other factors in addition to the tread wear amount of the tire at the time of calculating the wheel speed such as the wheel RPM. For example, as the slip rate of any one wheel is higher, the one wheel rotates less than a reference wheel, and as a result, in order to compensate the change amount of the wheel speed (e.g. the wheel RPM) according to the wheel slip rate, the wheel RPM correction unit 1160 may correct the wheel speed (e.g. the RPM) of the one wheel to be higher than the original wheel speed (e.g. the original wheel RPM) as the slip rate of the one wheel is higher. Further, as the weight of the vehicle increases to higher than a tolerance weight, the dynamic radius of the tire further decreases, and as the dynamic radius of the tire decreases, the wheel RPM per the same driving distance increases, and as a result, in order to compensate the change amount of the wheel speed (e.g. the wheel RPM) according to the weight of the vehicle 3000, the wheel RPM correction unit 1160 may correct the wheel speed (e.g. the RPM) of the one wheel to be higher as the reduction rate of the dynamic radius (e.g., the dynamic radius of the tire mounted on the one wheel) of the one wheel increases.

When the vehicle 3000 includes the front left wheel, the front right wheel, the rear left wheel, and the rear right wheel described above, the wheel RPM correction unit 1160 may correct each of the wheel speed (e.g. the wheel RPM) of the front left wheel, the wheel speed (e.g. the wheel RPM) of the front right wheel, the wheel speed (e.g. the wheel RPM) of the rear left wheel, and the wheel speed (e.g. the wheel RPM) of the rear right wheel provided from the wheel RPM calculation unit 1120. As another exemplary embodiment, the wheel RPM calculation unit 1120 may also selectively correct the wheel speed (e.g. the wheel RPM) only for some wheels (e.g. m wheels among n wheels).

The wheel speed (e.g. the wheel RPM) corrected by the wheel RPM correction unit 1160 may be provided to the remaining tread amount calculation unit 1130. Then, the remaining tread amount calculation unit 1130 may calculate the remaining tread amount based on the corrected wheel speed (e.g. the corrected wheel RPM) and the driving distance. Since the remaining tread amount calculation unit 1130 of FIG. 4 is substantially the same as or similar with the remaining tread amount calculation unit 1130 of FIG. 2 described above, a detailed description of the remaining tread amount calculation unit 1130 of FIG. 4 is made with reference to FIG. 2 and related contents. For example, the remaining tread amount calculation unit 1130 of FIG. 4 just receives the wheel speed (e.g. the wheel RPM) corrected unlike the remaining tread amount calculation unit 1130 of FIG. 2, and performs the substantially same task (or the substantially similar process) as the remaining tread amount calculation unit 1130 of FIG. 2.

Figure 6:
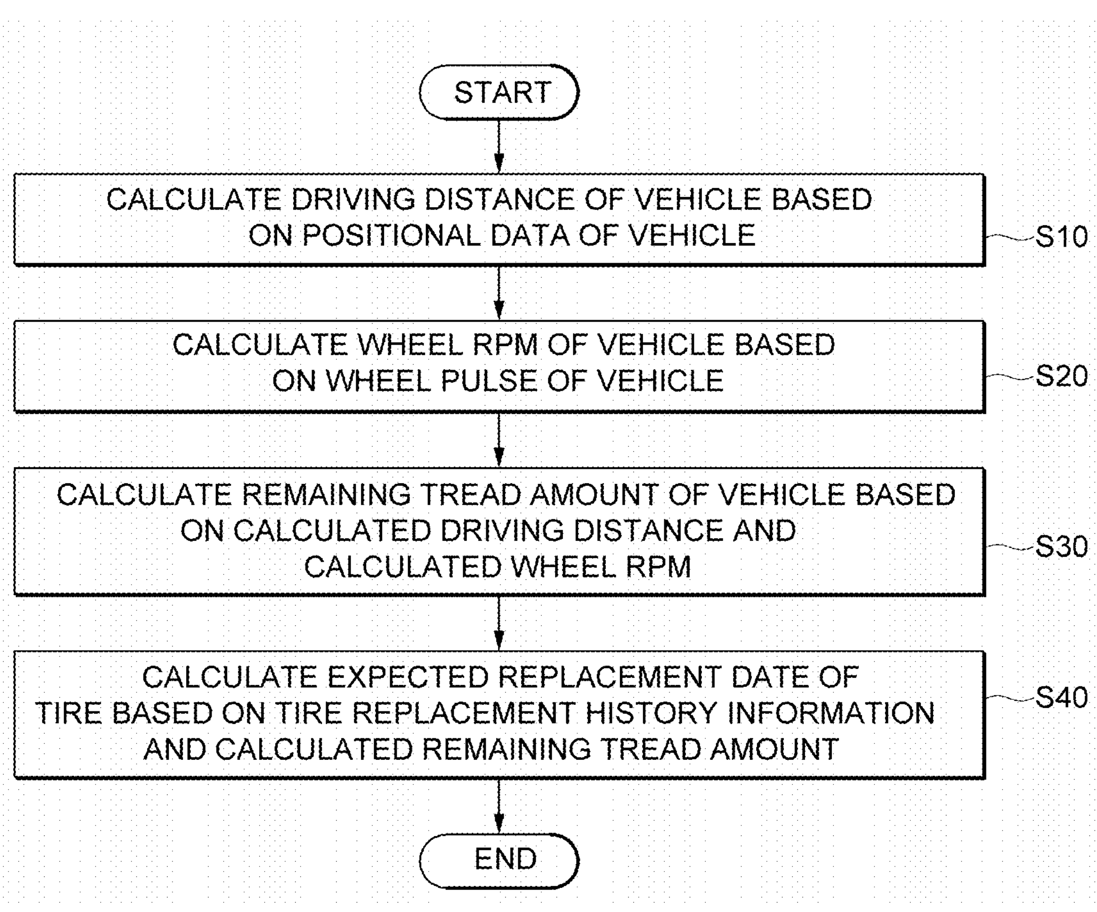
FIG. 6 is a flowchart for describing a tire life management method according to an exemplary embodiment of the present disclosure.

FIG. 6 is a flowchart for describing a tire life management method according to an exemplary embodiment of the present disclosure.

The tire life management method according to an exemplary embodiment of the present disclosure may include a tire monitoring step and/or an expected tire replacement date predicting step.

The tire monitoring step may include S10, S20, and S30. Detailed description thereof is as follows.

First, a driving distance of the vehicle 3000 may be calculated (step S10). The driving distance of the vehicle 3000 may be calculated based on positional data of the vehicle 3000, for example. Here, the positional data of the vehicle 3000 may include GNSS data provided from a terminal of the vehicle 3000. As another example, the driving distance of the vehicle 3000 may be calculated based on the positional data and an Internet map. For example, the positional data may be more precisely corrected through the Internet map.

Thereafter, a wheel speed (e.g. a wheel RPM) of the vehicle 3000 may be calculated (step S20). For example, the wheel speed (e.g. the wheel RPM) of the vehicle 3000 may be calculated based on a wheel pulse of the vehicle 3000.

Next, a remaining tread amount of the vehicle 3000 may be calculated (step S30). For example, the step S30 of calculating the remaining tread amount of the vehicle 3000 may be performed based on the calculated driving distance calculated at step S10 and the wheel speed (e.g. the wheel RPM) calculated at step S20. In this case, the remaining tread amount of the tire of the vehicle 3000 may be calculated based on a ratio between the driving distance of the vehicle 3000 and the wheel speed (e.g. the wheel RPM) of the vehicle 3000. For example, the remaining tread amount of the tire may be calculated based on the ratio of the driving distance to the wheel speed (e.g. the wheel RPM). As another example, the remaining tread amount of the tire may also be calculated based on the ratio of the wheel speed (e.g. the wheel RPM) to the driving distance. As an example, in the tire monitoring step, a dynamic radius of the tire may be calculated based on the ratio between the driving distance and the wheel speed (e.g. the wheel RPM) and the remaining tread amount (e.g., the driving distance/the wheel RPM or the wheel RPM/the driving distance) may be calculated based on the calculated dynamic radius. Here, the dynamic radius may be defined as Equation 1 described above.

Thereafter, the expected replacement date of the tire may be calculated (step S40). For example, the expected replacement date of the tire may be calculated based on tire replacement history information and the calculated remaining tread amount.

Meanwhile, the tire monitoring step may further include a step of comparing the calculated remaining tread amount with a predetermined threshold, and when it is confirmed that the calculated remaining tread amount is smaller than the threshold as a comparison result, generating alarm data.

Figure 7:
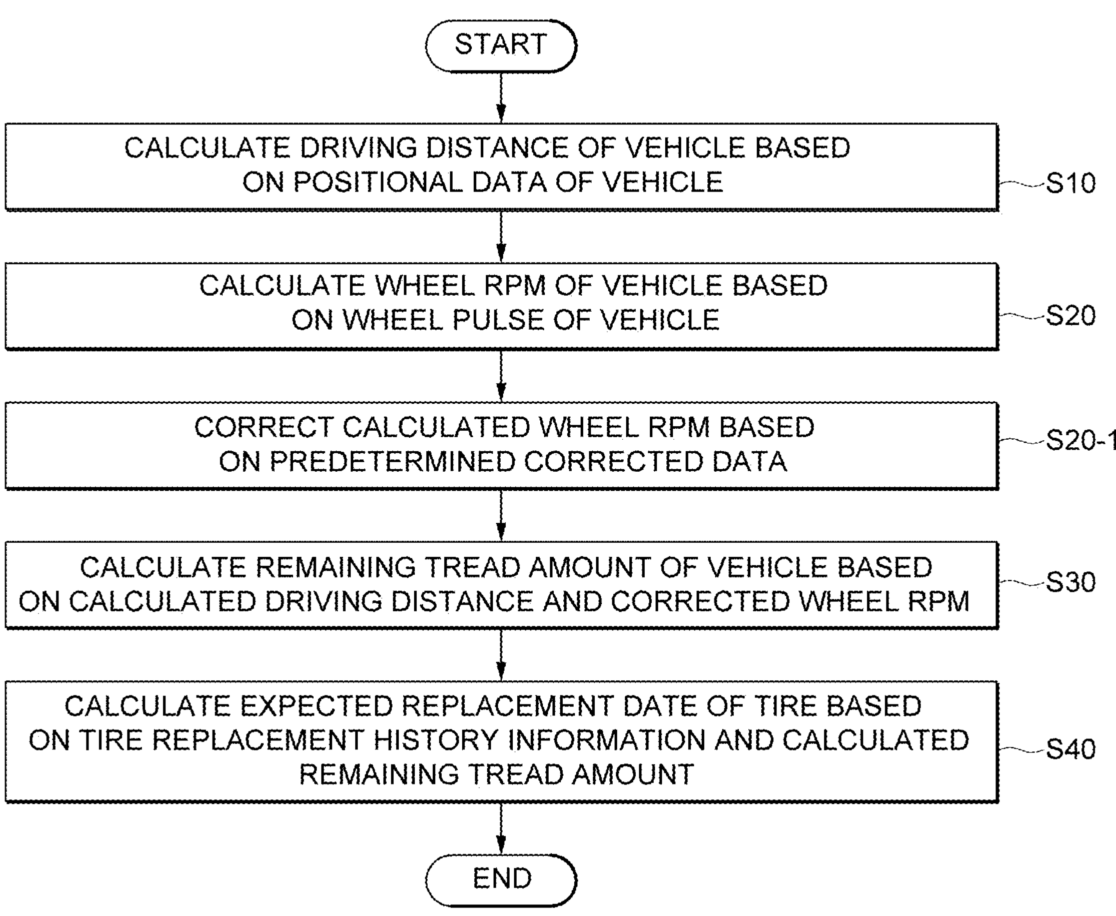
FIG. 7 is a flowchart for describing a tire life management method according to another exemplary embodiment of the present disclosure.
Figure 8:
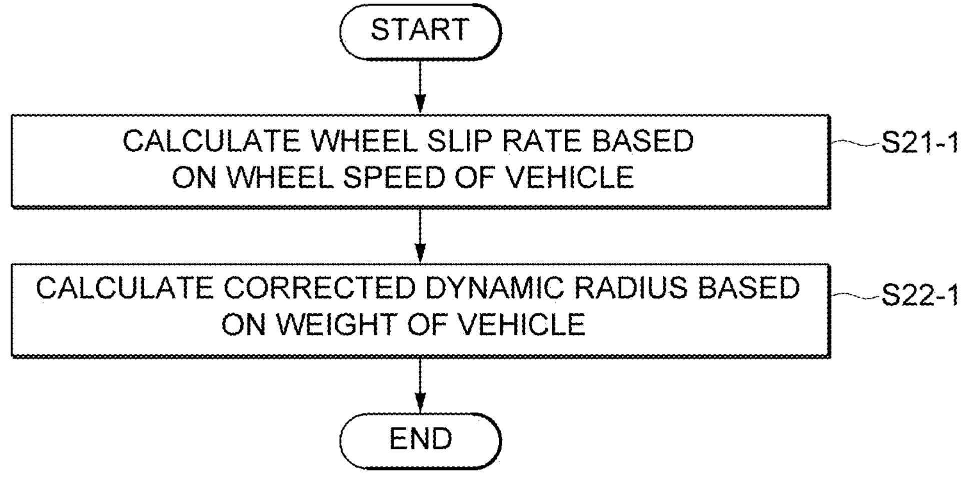
FIG. 8 is a detailed flowchart for an exemplary embodiment of a step of correcting a wheel speed of FIG. 7.

FIG. 7 is a flowchart for describing a tire life management method according to another exemplary embodiment of the present disclosure, and FIG. 8 is a detailed flowchart for a step of correcting an wheel speed in FIG. 7 according to another exemplary embodiment of the present disclosure.

The tire life management method according to another exemplary embodiment of the present disclosure may further include a step S20-1 of correcting an wheel speed (e.g. an wheel RPM) in addition to the exemplary embodiment of FIG. 7. Here, the wheel speed (e.g. the wheel RPM) may be corrected by using predetermined corrected data. The corrected data may include, for example, a wheel slip rate and a corrected dynamic radius.

As illustrated in FIG. 8, the step S20-1 of correcting the wheel speed (e.g. the wheel RPM) of FIG. 7 may include, for example, a step S21-1 of calculating the wheel slip rate and a step S22-1 of calculating the corrected dynamic radius.

The wheel slip rate may be calculated based on a wheel speed of the vehicle 3000, for example.

The corrected dynamic radius may be calculated based on a weight of the vehicle 3000, for example. In this case, the corrected dynamic radius may be calculated by using the look-up table 5000 of FIG. 5 storing a corrected dynamic radius predetermined according to the weight of the vehicle 3000 for example.

Meanwhile, the weight of the vehicle 3000 may be changed by the number of passengers of the vehicle, so the corrected dynamic radius calculation unit 1150 may predict the number of passengers by using vehicle data, calculate weights of a total number of passengers by multiplying the predicted number of passengers by a predetermined average weight, and calculate a final vehicle weight by adding the calculated weights to the weight of the vehicle. In addition, the corrected dynamic radius calculation unit 1150 may find or retrieve and output a value of the corrected dynamic radius corresponding to the calculated final vehicle weight from the look-up table.

Next, a brake pad monitoring apparatus 4000 of the consumables remaining amount calculation unit 1111 according to an exemplary embodiment the present disclosure will be described in detail as follows with reference to FIGS. 9 to 26.

Figure 9:
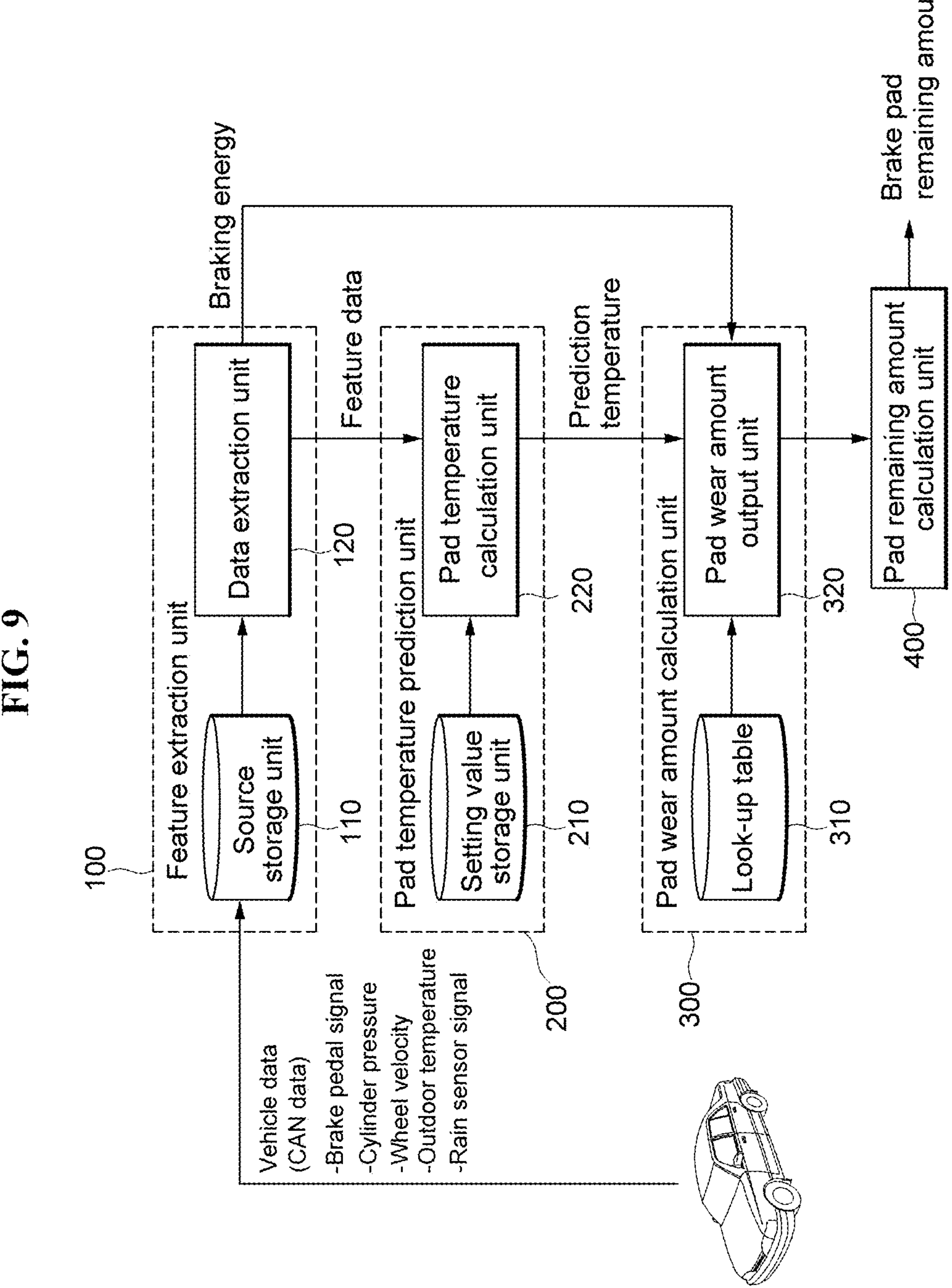
FIG. 9 is a block diagram of a brake pad monitoring apparatus of FIG. 1 according to an exemplary embodiment of the present disclosure.
Figure 10:
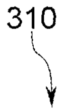
FIG. 10 is a diagram for illustrating an example of a look-up table of FIG. 9.

FIG. 9 is a block diagram of a brake pad monitoring apparatus 4000 according to an exemplary embodiment of the present disclosure and FIG. 10 is a diagram illustrating a look-up table 310 of FIG. 9.

According to an exemplary embodiment of the present disclosure, the brake pad monitoring apparatus 4000 may analyze vehicle data provided from the outside of the vehicle 3000 or the consumables remaining amount calculation unit 1111 (e.g., the server 2000) in an artificial intelligence scheme to calculate the remaining amount of the brake pad of the vehicle. As in the exemplary embodiment illustrated in FIG. 9, the brake pad monitoring apparatus 4000 according to an exemplary embodiment of the present disclosure may include a feature extraction unit 100, a pad temperature prediction unit 200, a pad wear amount calculation unit 300, and a pad remaining amount calculation unit 400.

Meanwhile, the brake pad monitoring apparatus 4000 may further receive acceleration/deceleration information of the vehicle in addition to the vehicle data, for example. Here, the acceleration/deceleration information of the vehicle may be an output signal output according to a brake pedal input signal to be described below. For example, the acceleration/deceleration information of the vehicle may include an acceleration or deceleration of the vehicle and a pressure of a cylinder (e.g., a master cylinder) to be described below. Meanwhile, the vehicle data may further include the acceleration/deceleration information.

The vehicle data as control area network (CAN) data for communication between various electronic parts (and/or electronic control units (ECUs)) of the vehicle, and the vehicle data may include, for example, the brake pedal input signal, a pressure (hereinafter, referred to as a cylinder pressure) of a cylinder (e.g., the master cylinder) of the vehicle, a wheel velocity of the vehicle, an outdoor temperature of the vehicle, and a rain sensor signal of the vehicle.

For example, the brake pedal input signal may include a change amount of the brake pedal input signal over time, the cylinder pressure may include a change amount of the cylinder pressure over time, the wheel velocity may include a change amount of an wheel velocity of any one wheel (i.e., a velocity of a rear right wheel of the vehicle) over time, the outdoor temperature may include a change amount of the outdoor temperature over time, and the rain sensor signal may include a change amount of the rain sensor signal over time. Here, the time may include, for example, a non-braking interval and a braking interval defined by the brake pedal input signal. For example, the time may include four non-braking intervals and three braking intervals. In this case, seven intervals may be categorized into non-braking and braking, and alternatively arranged along a time axis. For example, seven intervals described above may be arranged along the time axis in the order of a first non-braking interval, a first braking interval, a second non-braking interval, a second braking interval, a third non-braking interval, a third braking interval, and a fourth non-braking interval.

For example, the brake pedal input signal as a signal for judging whether the brake pedal is pressed may have a value of 0 (i.e., the brake pedal is not pressed) or 1 (the brake pedal is pressed). A brake pedal sensor of the vehicle may measure whether the brake pedal input signal is pressed or not. The brake pedal input signal may be provided from the brake pedal sensor.

The master cylinder may be a cylinder that provides braking force to the vehicle by supplying hydraulic pressure to the brake pad in response to the pressing of the brake pedal, and the pressure (hereinafter, referred to as cylinder pressure) of the master cylinder may mean pressure provided by the master cylinder or the hydraulic pressure. The cylinder pressure may be measured by a cylinder pressure sensor of the vehicle.

The wheel velocity may mean a rotational velocity of each wheel of the vehicle, and the velocity of each wheel may be individually measured by each wheel velocity sensor provided in each wheel. For example, the vehicle may include a front left wheel, a front right wheel, a rear left wheel, and a rear right wheel, and the wheel velocity may include a rotational velocity of the front left wheel, a rotational velocity of the front right wheel, a rotational velocity of the rear left wheel, and a rotational velocity of the rear right wheel.

The outdoor temperature may mean a temperature of an outside of the vehicle. For example, the outdoor temperature may be measured by a temperature sensor of the vehicle or received through a network.

The rain sensing signal may be a signal acquired from a rain sensor of the vehicle, and the rain sensing signal may include information indicating to which quantity of the rain the vehicle is exposed. The rain sensor may sense the amount of general water applied to the outside of the vehicle in addition to the rain.

The feature extraction unit 100 may extract feature data of the vehicle based on vehicle data input from the outside of the feature extraction unit 100. To this end, the feature extraction unit 100 may include, for example, a source storage unit (or one or more memories) 110 and a data extraction unit 120.

The source storage unit 110 may store the vehicle data input from the outside of the feature extraction unit 100. For example, the source storage unit 110 may store the brake pedal input signal, the cylinder pressure, the wheel velocity, the outdoor temperature, and the rain sensor signal provided from various electronic parts (e.g. sensors or controllers) of the vehicle.

The data extraction unit 120 may extract the feature data from the vehicle data stored in the source storage unit 110. The feature data may include braking energy of the vehicle. As an example, the feature data may include a length of the non-braking interval (e.g., a time duration of the non-braking interval), a length of the braking interval (e.g., a time duration of the braking interval), the cylinder pressure, a velocity of the vehicle (hereinafter, referred to as vehicle velocity), the braking energy, the outdoor temperature of the vehicle, and a quantity of rain. For example, the cylinder pressure may include a pressure of a cylinder for each interval, the vehicle velocity may include a velocity of a vehicle for each interval, the braking energy may include braking energy for each interval, the outdoor temperature may include an outdoor temperature of a vehicle for each interval, and the quantity may include a quantity of rain for each interval. Here, the interval may include the non-braking interval and the braking interval, and for example, the cylinder pressure for each interval may include a cylinder pressure in the non-braking interval and a cylinder pressure in the braking interval. There may be a plurality of non-braking intervals and braking intervals, and the plurality of braking intervals and the plurality of non-braking intervals may be alternatively arranged along the time axis. As one example, the plurality of braking intervals and the plurality of non-braking intervals may be arranged along the time axis in the order of a first non-braking interval, a first braking interval, a second non-braking interval, a second braking interval, a third non-braking interval, a third braking interval, and a fourth non-braking interval, . . . , an (n−1)th non-braking interval, an (n−1)th braking interval, an $n^{th}$ non-braking interval, and an $n^{th}$ braking interval. Here, n may be a natural number equal to or larger than 6, but not limited thereto. In such a case, the cylinder pressure for each interval may include a cylinder pressure in the first non-braking interval, a cylinder pressure in the first braking interval, a cylinder pressure in the second non-braking interval, a cylinder pressure in the second braking interval, a cylinder pressure in the (n−1)th non-braking interval, a cylinder pressure in the (n−1)th braking interval, a cylinder pressure in the $n^{th}$ non-braking interval, and a cylinder pressure in the $n^{th}$ braking interval. The vehicle velocity for each interval, the braking energy for each interval, the outdoor temperature for each interval, and the quantity for each interval may also include corresponding physical quantities in each non-braking interval and each braking interval as described above. A numerical value in each interval may mean, for example, but not limited to, an average value of the corresponding physical quantities in the interval. For example, the cylinder pressure in the first braking interval may mean an average pressure of the cylinder in the first braking interval, the vehicle velocity in the first braking interval may mean an average vehicle velocity in the first braking interval, the braking energy in the first braking interval may mean average braking energy in the first braking interval, the outdoor temperature in the first braking interval may mean an average outdoor temperature in the first braking interval, and the quantity in the first braking interval may mean an average quantity in the first braking interval.

The pad temperature prediction unit 200 may predict the temperature of the brake pad by analyzing the feature data from the feature extraction unit 100 by the artificial intelligence scheme, but not limited thereto. To this end, the pad temperature prediction unit 200 may include, for example, a setting value storage unit (or one or more memories) 210 and a pad temperature calculation unit 220.

The setting value storage unit 210 may store a predetermined model setting value. The model setting value is data prestored in the setting value storage unit 210.

The model setting value may be calculated through machine learning of the artificial intelligence scheme to calculate or infer the temperature of the brake pad of the vehicle corresponding to the vehicle data, for example. As a specific example, the model setting value may be calculated through machine learning for predetermined learning data, so the model setting value may include, for example, a statistical value for the vehicle data, a weight for the vehicle data, and a bias for the vehicle data. Here, the learning data may be data (or a data set) corresponding to the vehicle data. Through the machine learning through the learning data, the model learning unit may generate a model setting value to calculate or infer a brake pad temperature corresponding to the vehicle data. For example, the model setting value may include a weight and a bias for minimizing a value of a cost function. Meanwhile, the statistical value of the model setting value may include, for example, an average of the vehicle data and a standard deviation of the vehicle data.

To this end, the model learning unit may include, for example, a learning feature extraction unit and a setting value generation unit.

The learning feature extraction unit may extract the learning feature data from the learning data.

The setting value generation unit may generate a learning model based on the learning feature data of the learning feature extraction unit, and generate the model setting value by training the generated learning model. Meanwhile, the learning data may further include information on the brake pad temperature unlike the vehicle data, so the brake pad temperature includes a label. That is, the learning data may include a label corresponding to a class (e.g., a predicted temperature level or size of the brake pad) of input data.

A machine learning model may provide an algorithm that may be used for calculating or inferring and learning the data by learning a model for a data set (e.g., input data) as a file learned to recognize a specific type of pattern. After the model is learned, the input data (i.e., data not including the label) which is not previously displayed may be inferred by using the model and prediction (e.g., class prediction) for the input data may be made.

Meanwhile, the machine learning model may include, for example, an artificial neural network such as deep learning, neural network, convolution neural network, and recurrent neural network.

The machine learning may target, when it is assumed that each input data (e.g., vehicle data not including the label) given based on pre-known feature data belongs to any one class among a predetermined plurality of classes (e.g., a predicable brake pad temperature), determining to which class among the plurality of classes new input data belongs.

The pad temperature calculation unit 220 may calculate the temperature of the brake pad based on the feature data from the feature extraction unit 100 (e.g., the data extraction unit 120 of the feature extraction unit 100) and the model setting value from the setting value storage unit 210.

The pad wear amount calculation unit 300 may calculate the wear amount of the brake pad based on the temperature of the brake pad from the pad temperature prediction unit 200 and the braking energy from the feature extraction unit 100. To this end, according to an exemplary embodiment of the present disclosure, the pad wear amount calculation unit 300 may include, for example, a look-up table 310 and a pad wear amount output unit 320.

The look-up table 310 may be stored in a memory storing a value of a brake pad wear amount predetermined according to a value of the temperature of the brake pad and a value of the braking energy. For example, as illustrated in FIG. 10, the look-up table 310 may include wear amount values W11, W12, W13, . . . , W54, W55 of a plurality of brake pads defined by a matrix combination of values T1, T2, T3, T4, and T5 of temperatures of a plurality of brake pads and values E1, E2, E3, E4, and E5 of a plurality of braking energy.

The pad wear amount output unit 320 may search for a value of a brake wear amount from the look-up table 310 based on the temperature of the brake pad from the pad temperature prediction unit 200 and the braking energy from the feature extraction unit 100, and output the searched value of the brake wear amount. For example, as illustrated in FIG. 10, when the value T3 of the predicted brake pad temperature and the value E4 of the braking energy are input, the pad wear amount calculation unit 300 may select and output W34 as the value of the brake pad wear amount.

The pad remaining amount calculation unit 400 calculates the remaining amount of the brake pad based on the wear amount of the brake pad from the pad wear amount calculation unit 300. For example, the pad remaining amount calculation unit 400 calculates the remaining amount of the brake pad by subtracting the brake wear amount from the pad wear amount output unit 320 from a current thickness of the brake pad. Meanwhile, the remaining amount of the brake pad calculated from the pad remaining amount calculation unit 400 may be transmitted to a device associated with a customer through a network or a cloud system.

Figure 11:
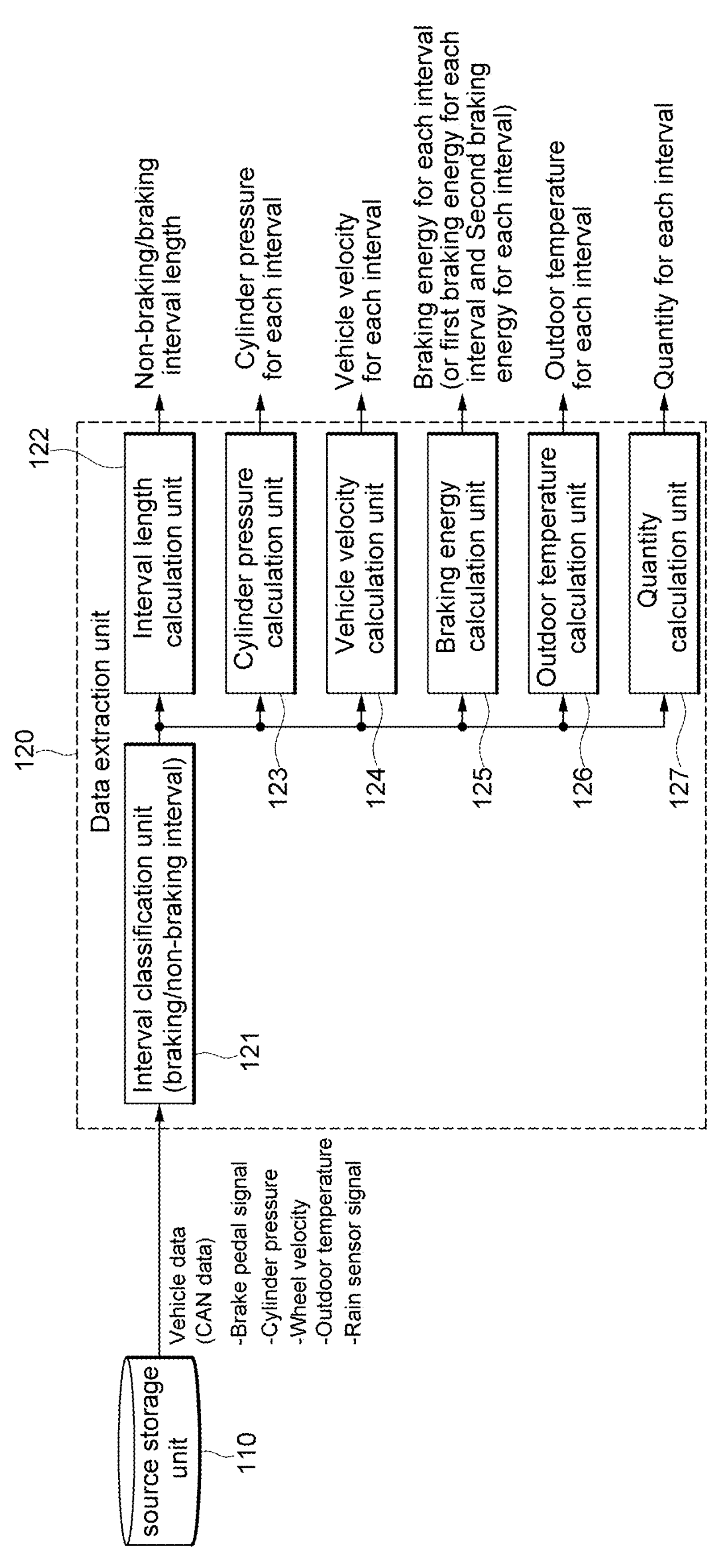
FIG. 11 is a detailed block diagram of a data extraction unit of FIG. 9 according to an exemplary embodiment of the present disclosure.

FIG. 11 is a detailed block diagram of the data extraction unit 120 of FIG. 9.

As illustrated in FIG. 11, the data extraction unit 120 may include an interval classification unit 121, an interval length calculation unit 122, a cylinder pressure calculation unit 123, a vehicle velocity calculation unit 124, a braking energy calculation unit 125, an outdoor temperature calculation unit 126, and a quantity calculation unit 127.

The interval classification unit 121 may classify the vehicle data stored in the source storage unit 110 into the non-braking interval and the braking interval of the vehicle. For example, the interval classification unit 121 may define non-braking intervals and braking intervals based on the brake pedal input signal. As a more specific example, an interval in which the value of the brake pedal input signal is 0 may be defined as non-braking intervals and an interval in which the value of the brake pedal input signal is 1 may be defined as the braking intervals.

The interval length calculation unit 122 may calculate lengths of the non-braking intervals and length of the braking intervals based on the vehicle data from the interval classification unit 121. For example, as illustrated in FIG. 11, the interval length calculation unit 122 may calculate the length (i.e., duration) of each of the non-braking intervals and the length (i.e., duration) of each of the braking intervals based on the brake pedal input signal.

The cylinder pressure calculation unit 123 may calculate the pressure for each interval of the cylinder (e.g., an average cylinder pressure for each interval) for providing the braking force of the vehicle based on the vehicle data from the interval classification unit 121. For example, the cylinder pressure calculation unit 123 may calculate the average cylinder pressure in each of the non-braking intervals and each of the braking intervals based on the cylinder pressure as illustrated in FIG. 11. A unit of the pressure may be bar.

The vehicle velocity calculation unit 124 may calculate a velocity of the vehicle for each interval of the vehicle based on the vehicle data from the interval classification unit 121. For example, the vehicle velocity calculation unit 124 may calculate the vehicle velocity (e.g., average vehicle velocity) in each of the non-braking intervals and each of the braking intervals based on the wheel velocity as illustrated in FIG. 11. Meanwhile, when the vehicle includes a plurality of wheels, the vehicle velocity calculation unit 124 may calculate a vehicle velocity (e.g., average vehicle velocity for each interval) in each of the non-braking intervals and each of the braking intervals based on a rotational velocity of the fastest wheel among the plurality of wheels. The unit of the vehicle velocity may be km/h.

The braking energy calculation unit 125 may calculate a braking energy for each interval (e.g., average braking energy for each interval) of the vehicle based on the vehicle data from the interval classification unit 121. For example, the braking energy for each interval may be calculated based on the vehicle velocity as illustrated in FIG. 11. In this case, as described above, the vehicle velocity may be calculated based on the wheel velocity. Therefore, the braking energy for each interval may be calculated based on the wheel velocity. As such, the braking energy calculation unit 125 may calculate the braking energy (e.g., average braking energy for each interval) in each of the non-braking intervals and each of the braking intervals based on the vehicle velocity caused by the wheel velocity. The unit of the braking energy as J (joule) may be calculated based on the mass and the vehicle velocity of the vehicle.

Meanwhile, when braking energy by a front-side brake of the vehicle and braking energy by a rear-side brake of the vehicle are intended to be separately calculated, the braking energy may include first braking energy and second braking energy. For example, the first braking energy means braking energy related to any one brake pad (hereinafter, referred to as a "first brake pad") of a left wheel and a right wheel of a front of the vehicle, and the second braking energy means braking energy related to any one brake pad (hereinafter, referred to as a second brake pad) of the left wheel and the right wheel of a rear of the vehicle. In other words, the first braking energy means braking energy related to front braking force of the vehicle and the second braking energy means braking energy related to rear braking force of the vehicle. In such a case, the braking energy calculation unit 125 may calculate the first braking energy (e.g., average first braking energy for each interval) in each of the non-braking intervals and each of the braking intervals and the second braking energy (e.g., average second braking energy for each interval) in each of the non-braking intervals and each of the braking intervals based on the vehicle velocity caused by the wheel velocity.

Meanwhile, since the brake pad of the front left wheel and the brake pad of the front right wheel are braked with the substantially same pressure, the first braking energy may be regarded as the front-side braking energy of the vehicle, and because the brake pad of the rear left wheel and the brake pad of the rear right wheel are braked with the substantially same pressure, the second braking energy may be regarded as the rear-side braking energy of the vehicle. The braking energy by the front-side brake of the vehicle may be larger than the braking energy by the rear-side brake of the vehicle.

The outdoor temperature calculation unit 126 may calculate an outdoor temperature of the vehicle for each interval (e.g., an average outdoor temperature for each interval) of the vehicle based on the vehicle data from the interval classification unit 121. In other words, the outdoor temperature calculation unit 126 may calculate an outdoor temperature of the vehicle in each of the non-braking intervals and each of the braking intervals (e.g., an average outdoor temperature for each interval) based on the vehicle data. The unit of the outdoor temperature may be ° C. or ° F.

The quantity calculation unit 127 may calculate a quantity of rain for each interval (e.g., an average quantity for each interval) based on the vehicle data from the interval classification unit 121. For example, the quantity calculation unit 127 may calculate the quantity of rain based on the rain sensor signal as illustrated in FIG. 11. In other words, the quantity calculation unit 127 may calculate the quantity of rain in each of the non-braking intervals and each of the braking intervals (e.g., an average quantity for each interval) based on the quantity.

Figure 12:
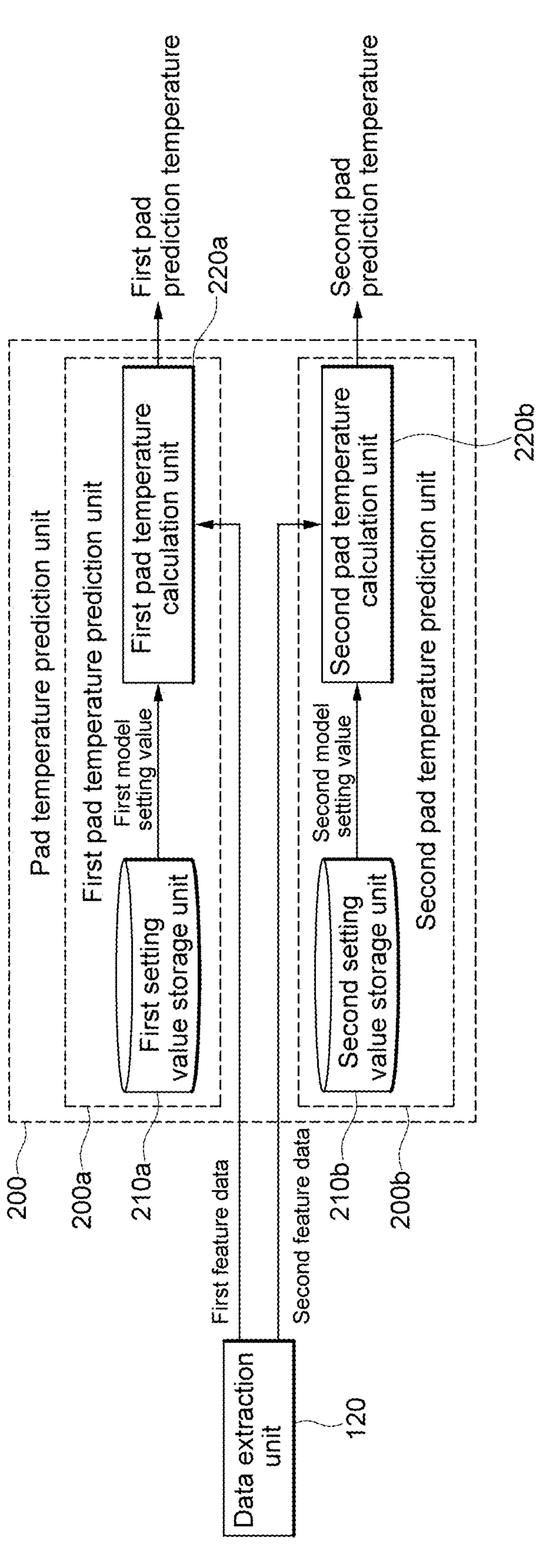
FIG. 12 is a block diagram of a pad temperature prediction unit of FIG. 9 according to another exemplary embodiment of the present disclosure.

FIG. 12 is a block diagram of another exemplary embodiment of the pad temperature prediction unit 200 of FIG. 9.

When the braking energy includes the first braking energy and the second braking energy as described above (or when the first braking energy and the second braking energy are separately calculated), the pad temperature prediction unit 200 may include two independent pad temperature prediction units, e.g., a first pad temperature prediction unit 200_a_ and a second pad temperature prediction unit 200_b_.

The first pad temperature prediction unit 200_a_ may predict a temperature of the first brake pad (e.g., a brake pad of a front-side wheel of the vehicle) by analyzing first feature data from the data extraction unit 120 by the artificial intelligence scheme. The first pad temperature prediction unit 200_a_ may include, for example, a first setting value storage unit 210_a_ and a first pad temperature calculation unit 220_a_. Here, the first feature data may include a length of the non-braking interval (e.g., a time duration of the non-braking interval), a length of the braking interval (e.g., a time duration of the braking interval), a cylinder pressure, a vehicle velocity, a first braking energy, an outdoor temperature, and a quantity of rain.

The first setting value storage unit (or one or more memories) 210_a_ may store a predetermined first model setting value. The first model setting value is data prestored in the setting value storage unit 210.

The first pad temperature calculation unit 220_a_ may calculate the temperature of the first brake pad based on the first feature data from the data extraction unit 120 and the first model setting value from the first setting value storage unit 210_a_.

The second pad temperature prediction unit 200_b_ may predict a temperature of the second brake pad (e.g., a brake pad of a rear-side wheel of the vehicle) by analyzing second feature data from the data extraction unit 120 by the artificial intelligence scheme. The second pad temperature prediction unit 200_b_ may include, for example, a second setting value storage unit 210_b_ and a second pad temperature calculation unit 220_b_. Here, the second feature data may include a length of the non-braking interval (e.g., a time duration of the non-braking interval), a length of the braking interval (e.g., a time duration of the braking interval), a cylinder pressure, a vehicle velocity, a second braking energy, a outdoor temperature, and a quantity of rain. Remaining information of the first feature data and remaining information of the second feature data other than the braking energy are the substantially same as each other.

The second setting value storage unit (or one or more memories) 210_b_ may store a predetermined second model setting value. The second model setting value is data prestored in the second setting value storage unit 210_b_.

The second pad temperature calculation unit 220_b_ may calculate the temperature of the second brake pad based on the second feature data from the data extraction unit 120 and the second model setting value from the second setting value storage unit 210_b_.

Since the first setting value storage unit 210_a_ and the second setting value storage unit 210_b_ of FIG. 12 are the same as the setting value storage unit 210 of FIG. 9, the first setting value storage unit 210_a_ and the second setting value storage unit 210_b_ are described with reference to the setting value storage unit 210 of FIG. 9 and a related disclosure. However, the first model setting value and the second model setting value have different values. The reason is that the first model setting value and the second model setting value are generated based on different learning data.

Since the first pad temperature calculation unit 220_a_ and the second pad temperature calculation unit 220_b_ of FIG. 12 are the same as the pad temperature calculation unit 220 of FIG. 9, the first pad temperature calculation unit 220_a_ and the second pad temperature calculation unit 220_b_ are described with reference to the pad temperature calculation unit 220 of FIG. 9 and a related disclosure thereto.

Figure 13:
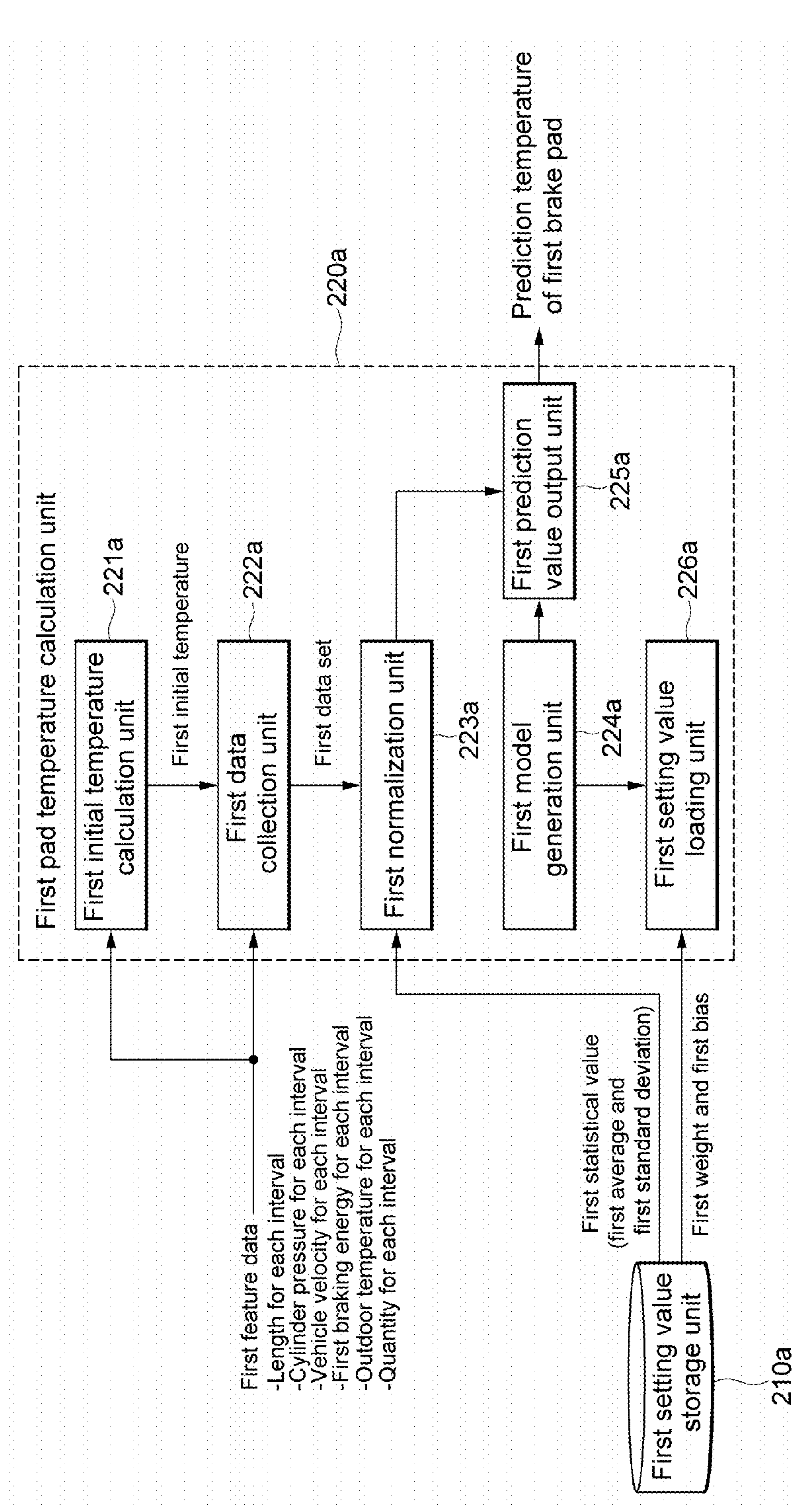
FIG. 13 is a detailed block diagram of a first pad temperature calculation unit of FIG. 9 according to an exemplary embodiment of the present disclosure.

FIG. 13 is a detailed block diagram of the first pad temperature calculation unit 220_a_ of FIG. 9.

As illustrated in FIG. 13, the first pad temperature calculation unit 220_a_ may include a first initial temperature calculation unit 221_a_, a first data collection unit 222_a_, a first normalization unit 223*a*, a first model generation unit 224*a*, a first prediction value output unit 225*a*, and a first setting value loading unit 226*a*.

The first initial temperature calculation unit 221*a* may calculate an initial temperature of the first brake pad based on the first feature data from the data extraction unit 120. A first initial temperature may be set based on a time length from a time when the vehicle is turned off up to a time when the vehicle starts or is turned on, the outdoor temperature of the vehicle, and a value defined by a predetermined first brake pad temperature characteristic curve. The time length from the time when the vehicle is turned off up to the time when the vehicle starts or is turned on may be calculated based on a time stamp included in index data of the first feature data.

The first data collection unit 222*a* may collect and output the first feature data from the data extraction unit 120 and the first initial temperature from the first initial temperature calculation unit 221*a* as one first data set. The first data set includes the first feature data including the first braking energy, and the first initial temperature.

The first normalization unit 223*a* may normalize the first data set from the first data collection unit 222*a* based on a first average and a first standard deviation of the vehicle data provided from the first setting value storage unit 210*a*.

The first model generation unit 224*a* may generate a first brake pad temperature prediction model based on a first weight and a first bias of the vehicle data retrieved or loaded from the first setting value storage unit 210*a*.

The first setting value loading unit 226*a* may load the first weight and the first bias of the vehicle data from the first setting value storage unit 210*a* to the first model generation unit 224*a*.

The first prediction value output unit 225*a* inputs the first data set normalized from the first normalization unit 223*a* into the first brake pad temperature prediction model from the first model generation unit 224*a* to calculate a first temperature change rate of the first brake pad and adds the first initial temperature to the calculated first temperature change rate to calculate the temperature of the first brake pad, and output the calculated brake pad temperature. For example, when the first data set of the first non-braking interval is input into the first brake pad temperature prediction model, the first brake pad temperature prediction model predicts and calculates a change amount (hereinafter, referred to as a temperature change amount of the first non-braking interval) of the first brake pad temperature at an end time of the first non-braking interval. Thereafter, the calculated temperature change amount of the first non-braking interval is added to the first initial temperature to calculate the prediction temperature of the first non-braking interval for the first brake pad. That is, a sum of the first initial temperature and the temperature change amount of the first non-braking interval may be defined as a first brake pad prediction temperature (hereinafter, referred to as a first non-braking interval prediction temperature) in the first non-braking interval. Thereafter, the first non-braking interval prediction temperature is set as a first initial temperature of an immediately contiguous next interval (e.g., the first braking interval). Thereafter, for example, when the first data set of the first braking interval is input into the first brake pad temperature prediction model, the first brake pad temperature prediction model predicts and calculates a change amount (hereinafter, referred to as a temperature change amount of the first braking interval) of the first brake pad temperature at the end of the first braking interval. Thereafter, the calculated temperature change amount of the first braking interval is added to the first non-braking interval prediction temperature set as the first initial temperature to calculate the prediction temperature of the first braking interval for the first brake pad. That is, a sum of the first non-braking interval prediction temperature set as the first initial temperature and the temperature change amount of the first braking interval may be defined as a first brake pad prediction temperature (hereinafter, referred to as a first braking interval prediction temperature) in the first braking interval. By such a scheme, a first non-braking interval prediction temperature, a first braking interval prediction temperature, a second non-braking interval prediction temperature, a second braking interval prediction temperature, a third non-braking interval prediction temperature, a third braking interval prediction temperature, and a fourth non-braking interval prediction temperature for the first brake pad may be calculated. That is, the first prediction value output unit 225*a* may calculate an interval-specific prediction temperature. In general, a prediction temperature change amount in the non-braking interval tends to decrease and the prediction temperature change amount in the braking interval tends to increase. Subsequently, the first prediction value output unit 225*a* sums up all of the first non-braking interval prediction temperature, the first braking interval prediction temperature, the second non-braking interval prediction temperature, the second braking interval prediction temperature, the third non-braking interval prediction temperature, the third braking interval prediction temperature, and the fourth non-braking interval prediction temperature for the first brake pad to finally calculate the prediction temperature of the first brake pad for a predetermined period (or time).

Figure 14:
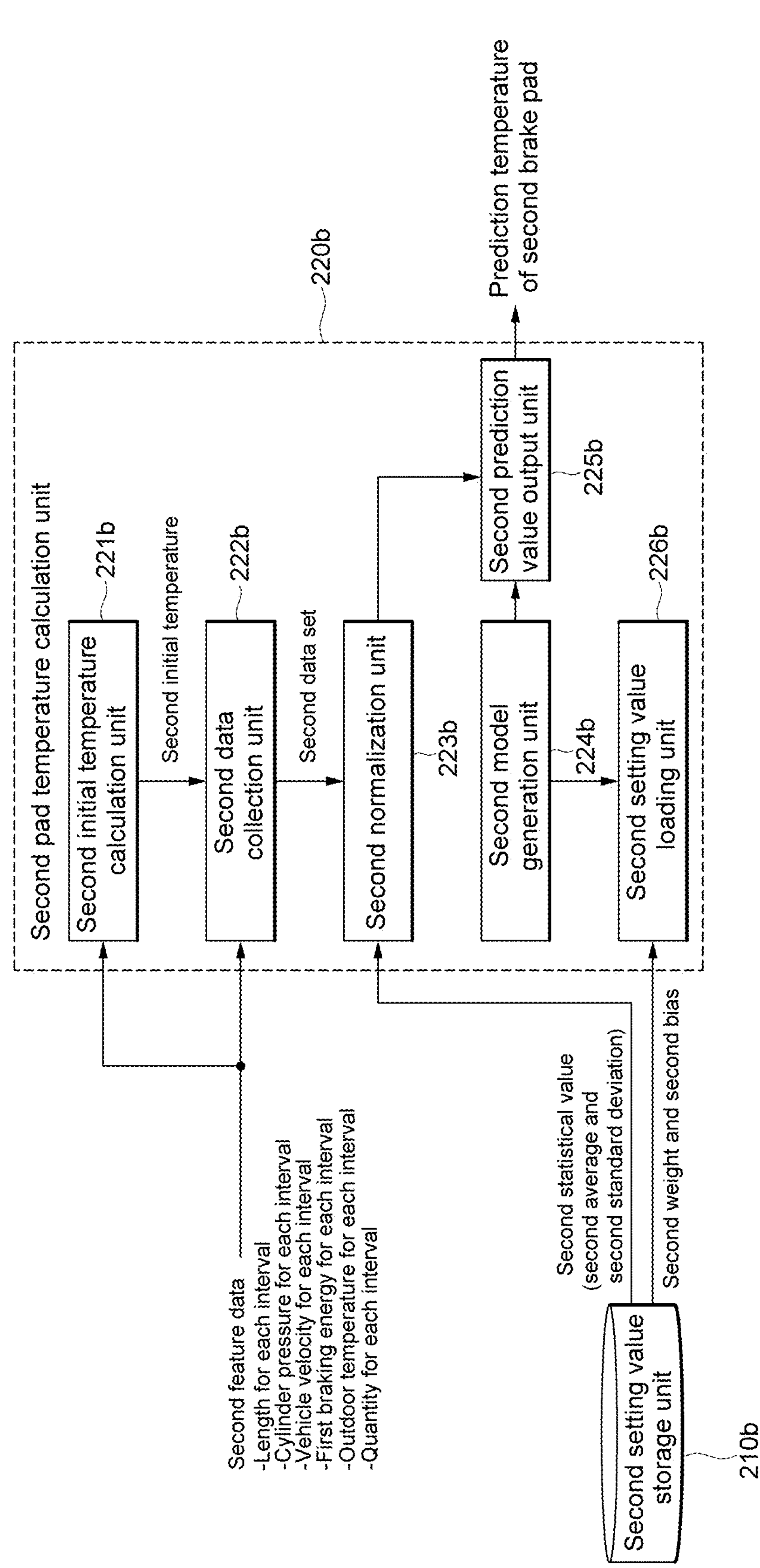
FIG. 14 is a detailed block diagram of a second pad temperature calculation unit of FIG. 12 according to an exemplary embodiment of the present disclosure.

FIG. 14 is a detailed block diagram of the second pad temperature calculation unit 220*b* of FIG. 12.

As illustrated in FIG. 14, the second pad temperature calculation unit 220*b* may include a second initial temperature calculation unit 221*b*, a second data collection unit 222*b*, a second normalization unit 223*b*, a second model generation unit 224*b*, a second prediction value output unit 225*b*, and a second setting value loading unit 226*b*.

Here, the second initial temperature calculation unit 221*b*, the second data collection unit 222*b*, the second normalization unit 223*b*, the second model generation unit 224*b*, the second prediction value output unit 225*b*, and the second setting value loading unit 226*b* are the substantially same as the first initial temperature calculation unit 221*a*, the first data collection unit 222*a*, the first normalization unit 223*a*, the first model generation unit 224*a*, the first prediction value output unit 225*a*, and the first setting value loading unit 226*a*, respectively.

The second initial temperature calculation unit 221*b* may calculate an initial temperature of the second brake pad based on the second feature data from the data extraction unit 120. A second initial temperature may be set based on a time length from a time when the vehicle is turned off up to a time when the vehicle starts or is turned on, the outdoor temperature of the vehicle, and a value defined by a predetermined second brake pad temperature characteristic curve. Meanwhile, the time length from the time when the vehicle is turned off up to the time when the vehicle starts is turned on may be calculated based on a time stamp included in index data of the second feature data. In this case, a second brake pad temperature characteristic curve has a different characteristic from the first brake pad temperature characteristic curve.

The second data collection unit 222*b* may collect and output the second feature data from the data extraction unit

120 and the second initial temperature from the second initial temperature calculation unit 221*b* as one second data set. The second data set includes the second feature data including the second braking energy, and the second initial temperature.

The second normalization unit 223*b* may normalize the second data set from the second data collection unit 222*b* based on a second average and a second standard deviation of the vehicle data provided from the second setting value storage unit 210*b*.

The second model generation unit 224*b* may generate a second brake pad temperature prediction model based on a second weight and a second bias of the vehicle data retrieved or loaded from the second setting value storage unit 210*b*.

The second setting value loading unit 226*b* may load the second weight and the second bias of the vehicle data from the second setting value storage unit 210*b* to the second model generation unit 224*b*.

The second prediction value output unit 225*b* inputs the second data set normalized from the second normalization unit 223*b* into the second brake pad temperature prediction model from the second model generation unit 224*b* to calculate a second temperature change rate of the second brake pad and adds the second initial temperature to the calculated second temperature change rate to calculate the temperature of the second brake pad, and output the calculated brake pad temperature. For example, when the second data set of the first non-braking interval is input into the second brake pad temperature prediction model, the second brake pad temperature prediction model predicts and calculates a change amount (hereinafter, referred to as a temperature change amount of the first non-braking interval) of the second brake pad temperature at an end of the first non-braking interval. Thereafter, the calculated temperature change amount of the first non-braking interval is added to the second initial temperature to calculate the prediction temperature of the first non-braking interval for the second brake pad. That is, a sum of the second initial temperature and the temperature change amount of the first non-braking interval may be defined as a second brake pad prediction temperature (hereinafter, referred to as a first non-braking interval prediction temperature) in the first non-braking interval. Thereafter, the first non-braking interval prediction temperature is set as a second initial temperature of an immediately contiguous next interval (e.g., the first braking interval). Thereafter, for example, when the second data set of the first braking interval is input into the second brake pad temperature prediction model, the second brake pad temperature prediction model predicts and calculates a change amount (hereinafter, referred to as a temperature change amount of the first braking interval) of the second brake pad temperature at the end time of the first braking interval. Thereafter, the calculated temperature change amount of the first braking interval is added to the first non-braking interval prediction temperature set as the second initial temperature to calculate the prediction temperature of the first braking interval for the second brake pad. That is, a sum of the first non-braking interval prediction temperature set as the second initial temperature and the temperature change amount of the first braking interval may be defined as a second brake pad prediction temperature (hereinafter, referred to as a first braking interval prediction temperature) in the first braking interval. By such a scheme, the first non-braking interval prediction temperature, the first braking interval prediction temperature, the second non-braking interval prediction temperature, the second braking interval prediction temperature, the third non-braking interval prediction temperature, the third braking interval prediction temperature, and the fourth non-braking interval prediction temperature for the second brake pad may be calculated. That is, the first prediction value output unit 225*a* may calculate the interval-specific prediction temperature for the second brake pad. In general, a prediction temperature change amount in the non-braking interval tends to decrease and the prediction temperature change amount in the braking interval tends to increase. Subsequently, the first prediction value output unit 225*a* sums up all of the first non-braking interval prediction temperature, the first braking interval prediction temperature, the second non-braking interval prediction temperature, the second braking interval prediction temperature, the third non-braking interval prediction temperature, the third braking interval prediction temperature, and the fourth non-braking interval prediction temperature for the second brake pad to finally calculate the prediction temperature of the second brake pad for a predetermined period (or time).

Meanwhile, when there is only one braking energy, the pad temperature calculation unit 220 of FIG. 9 may include an initial temperature calculation unit, a data collection unit, a normalization unit, a model generation unit, a setting value loading unit, and a prediction value output unit. In this case, the initial temperature calculation unit, the data collection unit, the normalization unit, the model generation unit, the setting value loading unit, and the prediction value output unit may be the substantially the same as the first initial temperature calculation unit 221*a*, the first data collection unit 222*a*, the first normalization unit 223*a*, the first model generation unit 224*a*, the first prediction value output unit 225*a*, and the first setting value loading unit 226*a* of FIG. 13, respectively. Therefore, a detailed configuration of the pad temperature calculation unit 220 of FIG. 9 is described with reference to FIG. 13 (or FIG. 14) and a related disclosure.

Figure 15:
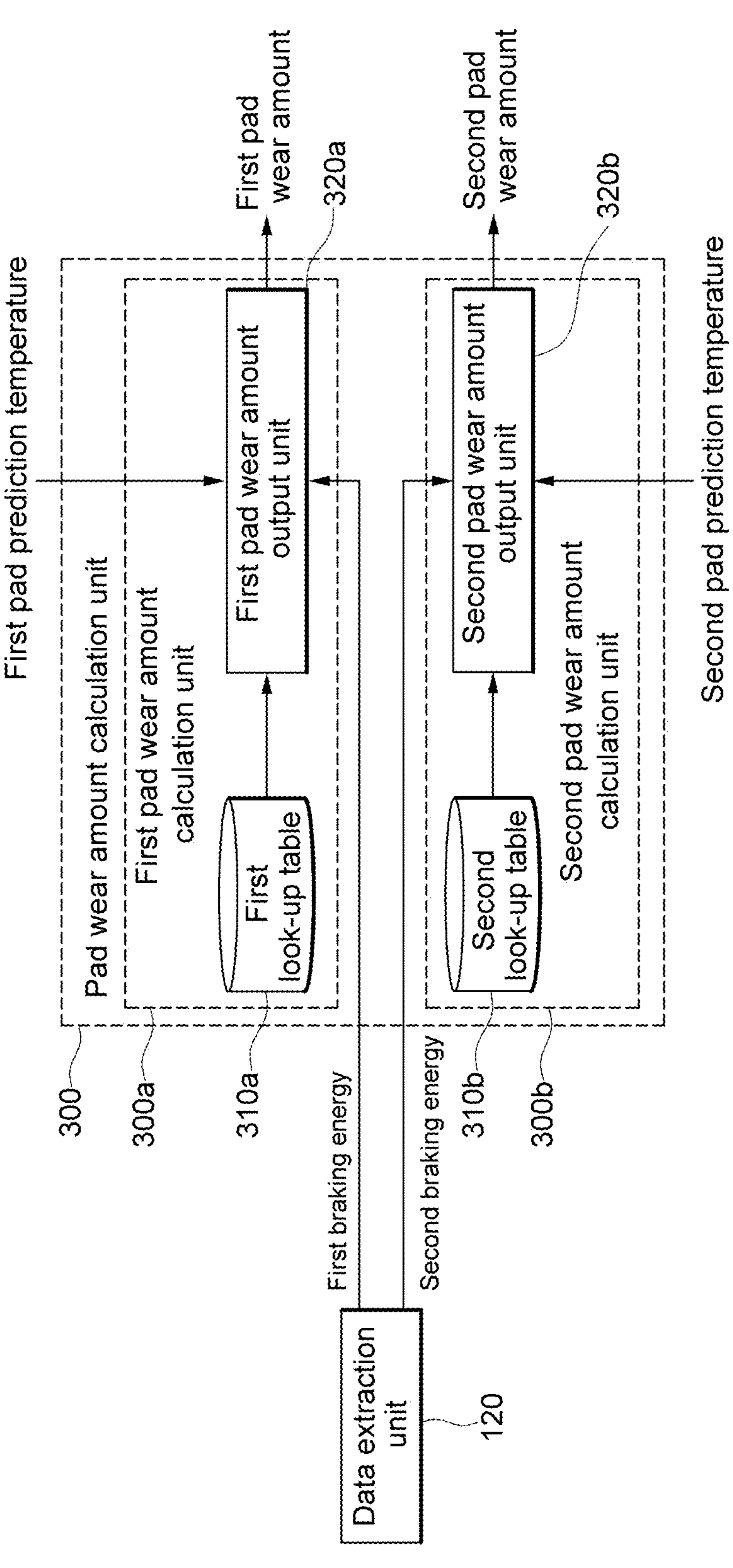
FIG. 15 is a block diagram of a pad wear amount calculation unit of FIG. 9 according to another exemplary embodiment of the present disclosure.

FIG. 15 is a block diagram according to another exemplary embodiment of the pad wear amount calculation unit 300 of FIG. 9.

When the braking energy includes the first braking energy and the second braking energy as described above (or when the first braking energy and the second braking energy are separately calculated), the pad wear amount calculation unit 300 may include two independent pad wear amount calculation units, e.g., a first pad wear amount calculation unit 300*a* and a second pad wear amount calculation unit 300*b* as illustrated in FIG. 15.

The first pad wear amount calculation unit 300*a* may include a first look-up table 310*a* and a first pad wear amount output unit 320*a*.

The first look-up table 310*a* may store a value of a wear amount of the first brake pad predetermined according to a value of the temperature of the first brake pad and a value of the braking energy.

The first pad wear amount output unit 320*a* may search for a wear amount of the first brake pad from the first look-up table 310*a* based on the temperature of the first brake pad from the first pad temperature prediction unit 200*a* and the first braking energy from the feature extraction unit 100, and output the searched wear amount of the first brake pad.

The second pad wear amount calculation unit 300*b* may include a second look-up table 310*b* and a second pad wear amount output unit 320*b*.

The second look-up table 310*b* may be stored in one or more memories and may store a value of a wear amount of the second brake pad predetermined according to a value of the temperature of the second brake pad and a value of the braking energy.

The second pad wear amount output unit 320*b* may search for a wear amount of the second brake pad from the second look-up table 310*b* based on the temperature of the second brake pad from the second pad temperature prediction unit 200*b* and the second braking energy from the feature extraction unit 100, and output the searched wear amount of the second brake pad.

Here, since the first look-up table 310*a* and the second look-up table 310*b* are the substantially same as the look-up table 310 of FIG. 10, the first look-up table 310*a* and the second look-up table 310*b* are described with reference to FIG. 10 and a related description.

Further, since the first pad wear amount output unit 320*a* and the second pad wear amount output unit 320*b* are the same as or substantially similar to the pad wear amount output unit 320 of FIG. 9, the first pad wear amount output unit 320*a* and the second pad wear amount output unit 320*b* are described with reference to FIG. 9 and a related description.

Figure 16:
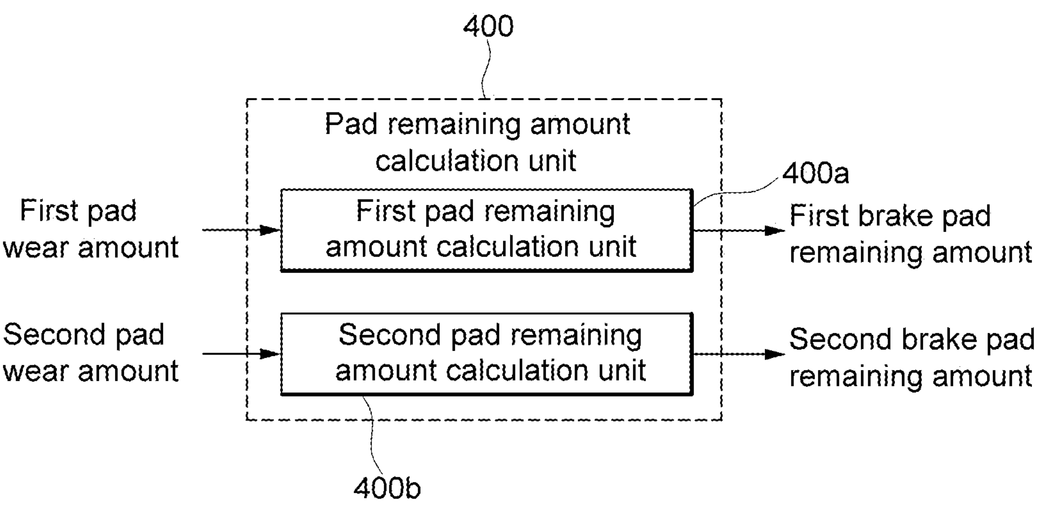
FIG. 16 is a block diagram of a pad remaining amount calculation unit of FIG. 9 according to another exemplary embodiment of the present disclosure.

FIG. 16 is a block diagram according to another exemplary embodiment of the pad remaining amount calculation unit 400 of FIG. 9.

When the braking energy includes the first braking energy and the second braking energy as described above, the pad remaining amount calculation unit 400 may include two independent pad remaining amount calculation units, e.g., a first pad remaining amount calculation unit 400*a* and a second pad remaining amount calculation unit 400*b*.

The first pad remaining amount calculation unit 400*a* may calculate the remaining amount of the first brake pad based on the wear amount of the first brake pad from the first pad wear amount calculation unit 300*a*. For example, the first pad remaining amount calculation unit 400*a* may calculate the remaining amount of the first brake pad by subtracting the first brake wear amount from the first pad wear amount output unit 320*a* from a current thickness of the first brake pad. Meanwhile, the remaining amount of the first brake pad calculated from the first pad remaining amount calculation unit 400*a* may be transmitted to a device associated with the customer through a network or a cloud system. Meanwhile, the first pad remaining amount calculation unit 400*a* may generate an alarm or warning when the calculated remaining amount of the first brake pad is smaller than a predetermined first threshold.

The second pad remaining amount calculation unit 400*b* may calculate the remaining amount of the second brake pad based on the wear amount of the second brake pad from the second pad wear amount calculation unit 300*b*. For example, the second pad remaining amount calculation unit 400*b* may calculate the remaining amount of the second brake pad by subtracting the second brake wear amount from the second pad wear amount output unit 320*b* from a current thickness of the second brake pad. Meanwhile, the remaining amount of the second brake pad calculated from the second pad remaining amount calculation unit 400*b* may be transmitted to a device associated with the customer through a network or a cloud system. Meanwhile, the second pad remaining amount calculation unit 400*b* may generate the alarm or warning when the calculated remaining mount of the second brake pad is smaller than a predetermined second threshold. Here, the second threshold may be different from the first threshold. As a specific example, the second threshold may be smaller or larger than the first threshold.

Figure 17:
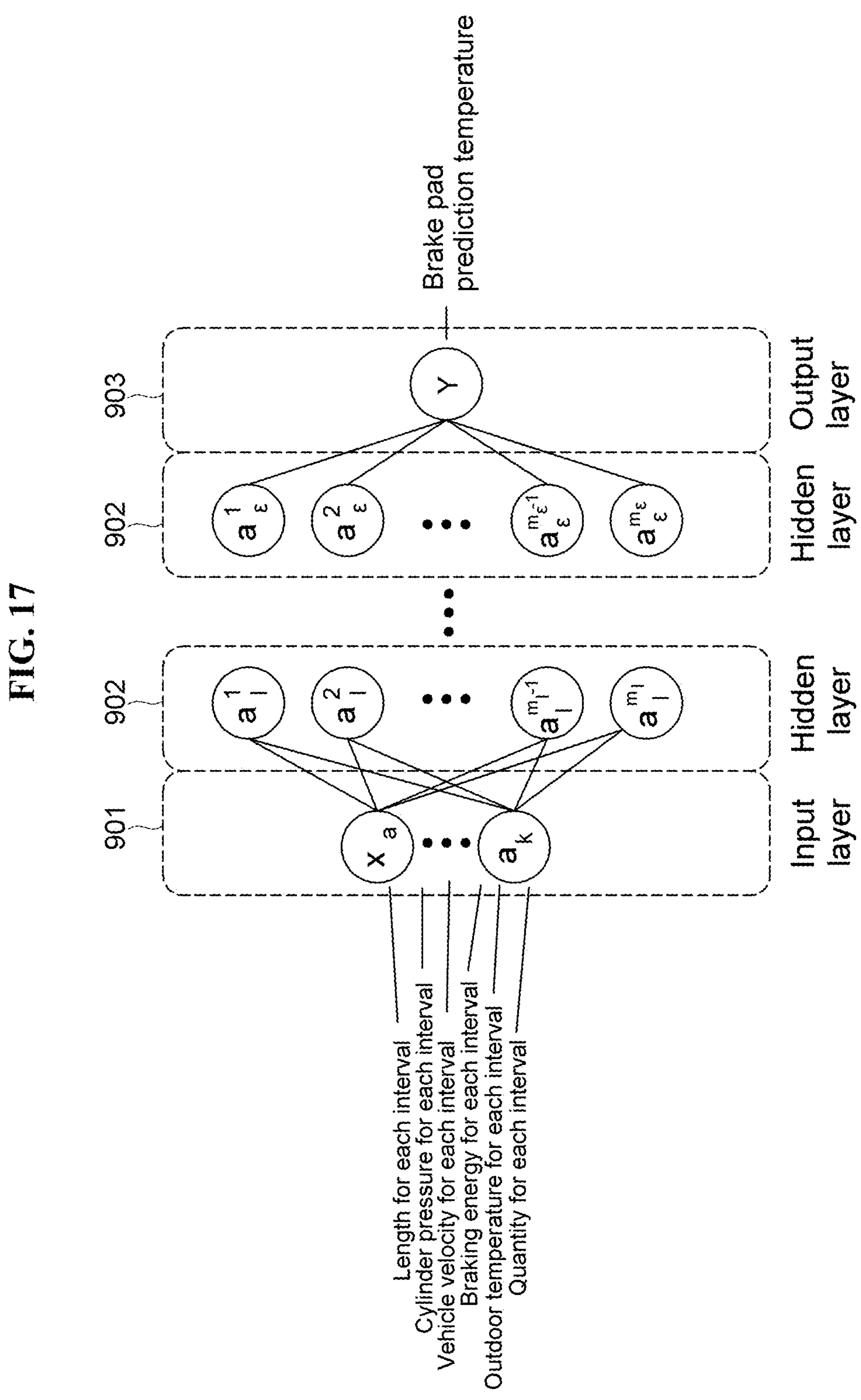
FIG. 17 is a diagram for illustrating an artificial neural network structure applied to a model generation unit and a setting value loading unit of FIGS. 13 and 14 according to an exemplary embodiment of the present disclosure.

FIG. 17 is a diagram illustrating an artificial neural network structure applied to a model generation unit and a setting value loading unit of FIGS. 13 and 14.

The model generation unit (e.g., the first model generation unit 224*a* or the second model generation unit 224*b*) and the setting value loading unit (e.g., the first setting value loading unit 226*a* or the second setting value loading unit 226*b*) may generate a prediction model for predicting a brake pad temperature through an artificial neural network structure illustrated in FIG. 17.

For example, the model generation unit may generate a brake pad temperature prediction model of the artificial neural network structure illustrated in FIG. 17 based on the weight of the vehicle data and the bias of the vehicle data loaded through the setting value loading unit.

The artificial neural network may be a network of a structure in which multiple neurons are connected to each other, and may receive data (e.g., vehicle data) to be predicted through an input layer 901. As the input data is processed through hidden layers 902 of various steps, a final result (e.g., a brake pad temperature) may be output through an output layer 903.

Figure 18:
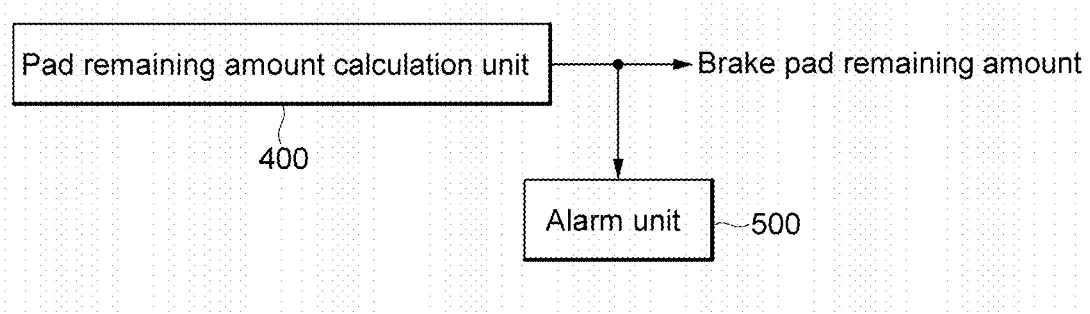
FIG. 18 is a block diagram of a pad remaining amount calculation unit and an alarm unit of FIG. 9 according to an exemplary embodiment of the present disclosure.

FIG. 18 is a block diagram of a pad remaining amount calculation unit and an alarm unit of FIG. 9.

The brake pad monitoring apparatus 4000 according to an exemplary embodiment of the present disclosure may further include an alarm unit 500 as illustrated in FIG. 18.

The alarm unit 500 compares the remaining amount of the brake pad calculated by the pad remaining amount calculation unit 400 with a predetermined threshold, and determines whether to output the alarm according to a comparison result. For example, when the calculated remaining amount of the brake pad is smaller than the predetermined threshold, the alarm unit 500 outputs the alarm. The alarm unit 500 may be disposed inside the vehicle.

Meanwhile, when the pad remaining amount calculation unit 400 includes the first pad remaining amount calculation unit 400*a* and the second pad remaining amount calculation unit 400*b* as illustrated in FIG. 16, the alarm unit 500 may include a first alarm unit and a second alarm unit.

In this case, the first alarm unit compares the remaining amount of the first brake pad calculated by the first pad remaining amount calculation unit 400*a* with a predetermined first threshold, and determines whether to output the alarm according to a comparison result. For example, when the calculated remaining amount of the first brake pad is smaller than the first threshold, the first alarm unit outputs the alarm. The first alarm unit may be disposed inside the vehicle.

Meanwhile, the second alarm unit compares the remaining amount of the second brake pad calculated by the second pad remaining amount calculation unit 400*b* with a predetermined second threshold, and determines whether to output the alarm according to a comparison result. For example, when the calculated remaining amount of the second brake pad is smaller than the second threshold, the second alarm unit outputs the alarm. The second alarm unit may be disposed inside the vehicle.

Here, the second threshold may be different from the first threshold. As a specific example, the second threshold may be smaller or larger than the first threshold.

Figure 19:
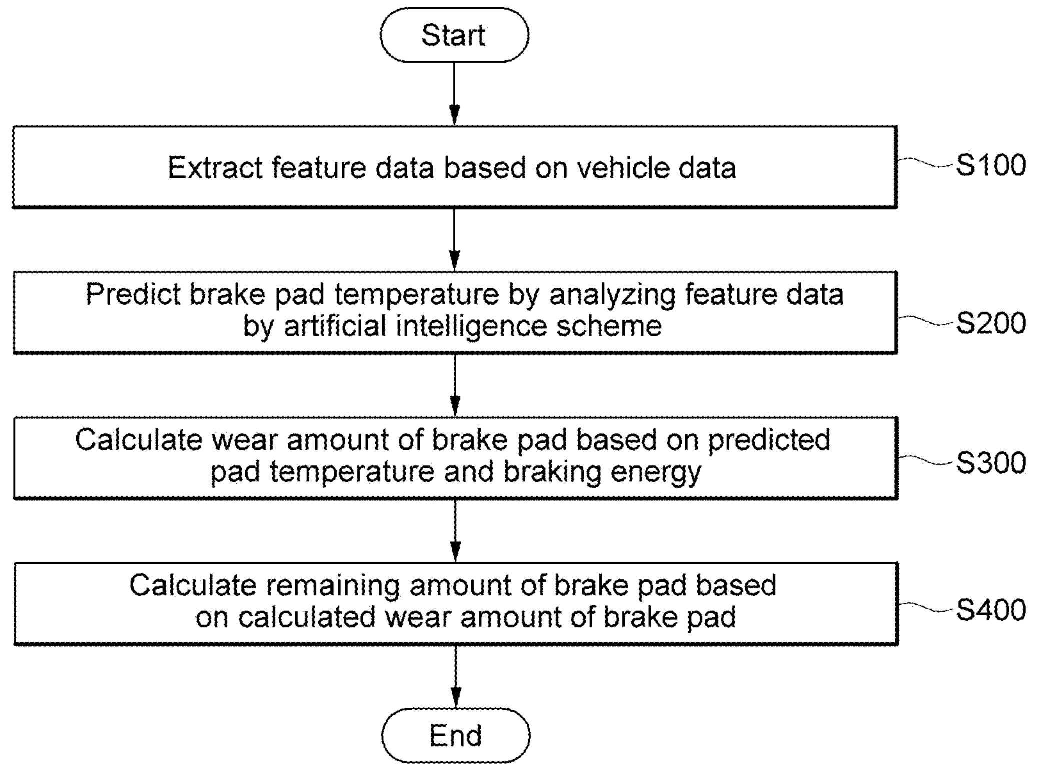
FIG. 19 is a flowchart for describing a brake pad monitoring method according to an exemplary embodiment of the present disclosure.

FIG. 19 is a flowchart for describing a brake pad monitoring method according to an exemplary embodiment of the present disclosure.

The brake pad monitoring method according to an exemplary embodiment of the present disclosure includes a step of calculating a remaining amount of a brake pad of a vehicle by analyzing vehicle data input from the outside of the vehicle by an artificial intelligence scheme.

For example, as illustrated in FIG. 19, according to the brake pad monitoring method according to an exemplary embodiment of the present disclosure, first, feature data including braking energy of a vehicle is extracted based on the vehicle data input from the outside of the vehicle (S100).

Thereafter, a temperature of a brake pad is predicted by analyzing the extracted feature data by the artificial intelligence scheme (S200).

Next, a wear amount of the brake pad is calculated based on the predicted temperature of the brake pad and the extracted braking energy (S300).

Subsequently, the remaining amount of the brake pad is calculated based on the calculated wear amount of the braked pad (S400). For example, the remaining amount of the brake pad may be calculated by subtracting the calculated brake wear amount from a current thickness of the brake pad.

Figure 20:
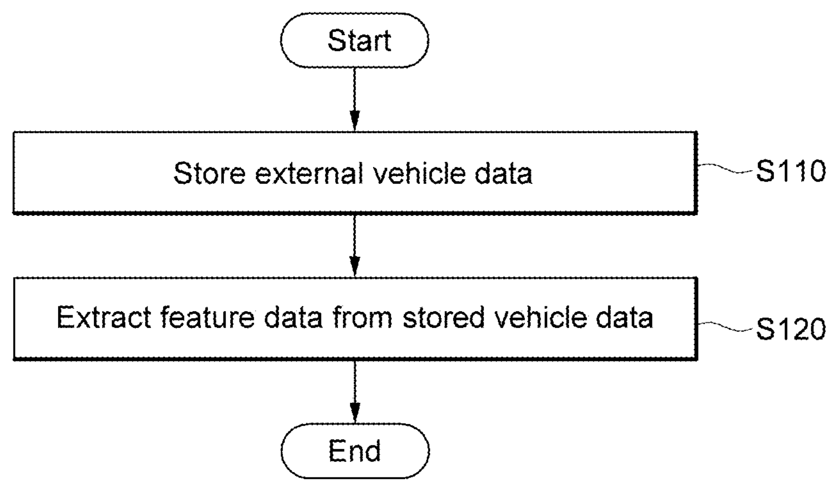
FIG. 20 is a flowchart for describing a step of extracting feature data of FIG. 19 according to an exemplary embodiment of the present disclosure.

FIG. 20 is a flowchart for describing an exemplary embodiment of a step of extracting feature data of FIG. 19.

The step S100 of extracting the feature data in FIG. 19 may include one or more of steps illustrated in FIG. 20.

First, the vehicle data input from the outside of the vehicle is stored (S110).

Thereafter, the feature data is extracted from the stored vehicle data (S120).

Figure 21:
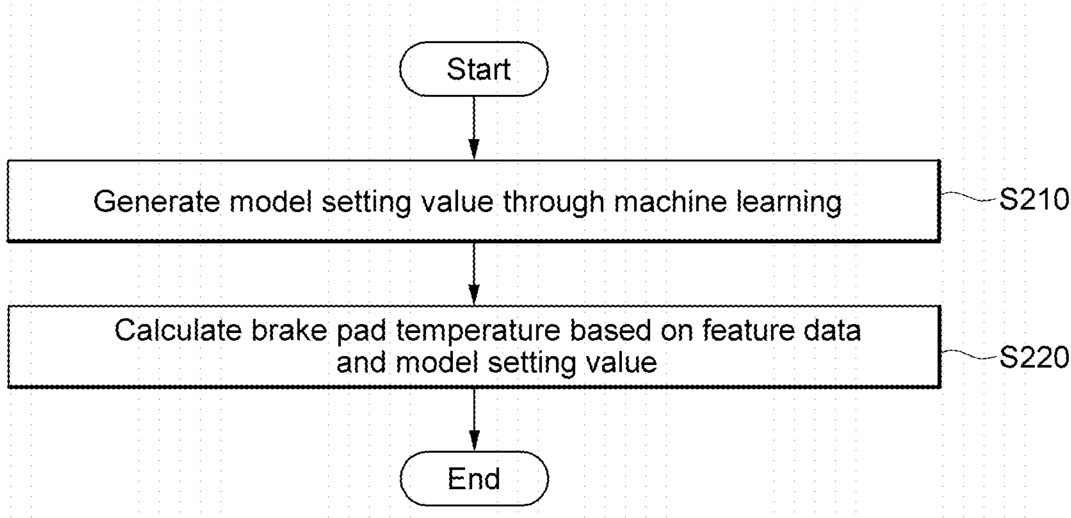
FIG. 21 is a flowchart for describing a step of predicting a temperature of a brake pad of FIG. 19 according to an exemplary embodiment of the present disclosure.

FIG. 21 is a flowchart for describing an exemplary embodiment of a step of predicting a temperature of a brake pad of FIG. 19.

The step S200 of predicting the temperature of the brake pad in FIG. 19 may include one or more of steps illustrated in FIG. 21.

First, a model setting value calculated by the machine learning of the artificial intelligence scheme to calculate or infer the temperature of the brake pad corresponding to the vehicle data is stored (S210).

Thereafter, the temperature of the brake pad is calculated based on the extracted feature data and the stored model setting value (S220).

Figure 22:
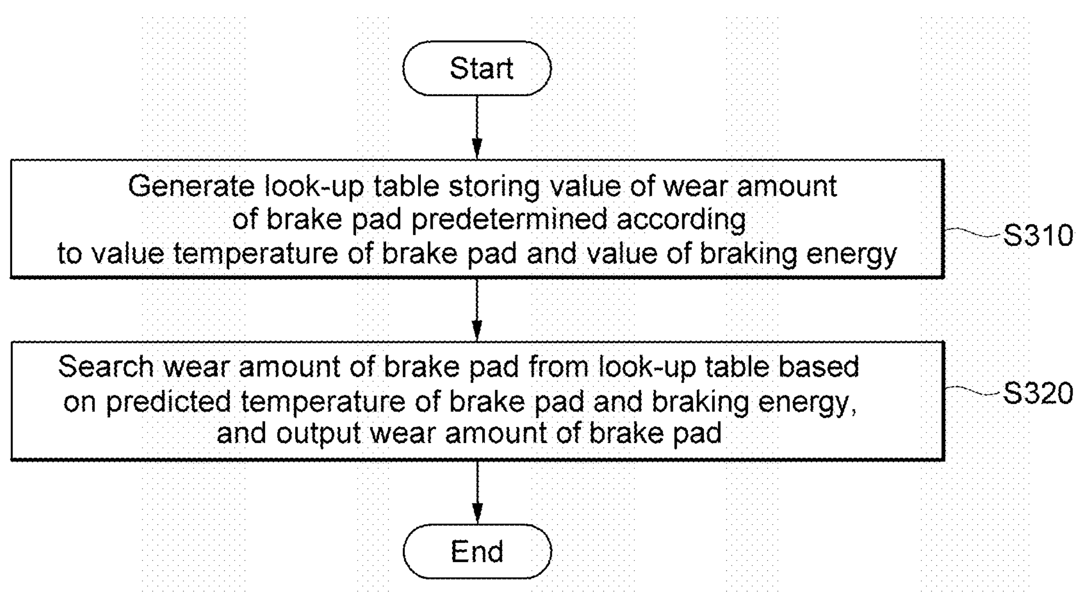
FIG. 22 is a flowchart for describing a step of calculating a wear amount of the brake pad of FIG. 19 according to an exemplary embodiment of the present disclosure.

FIG. 22 is a flowchart for describing an exemplary embodiment of a step of calculating a wear amount of the brake pad of FIG. 19.

The step S300 of calculating the wear amount of the brake pad in FIG. 19 may include one or more of steps illustrated in FIG. 22.

First, the look-up table 310 storing a value of the wear amount of the brake pad predetermined according to a value of the temperature of the brake pad and a value of the braking energy is generated (S310).

Thereafter, the wear amount of the brake pad from the look-up table 310 is searched based on the predicted temperature of the brake pad and the extracted braking energy, and the wear amount of the searched brake pad is outputted (S320).

Figure 23:
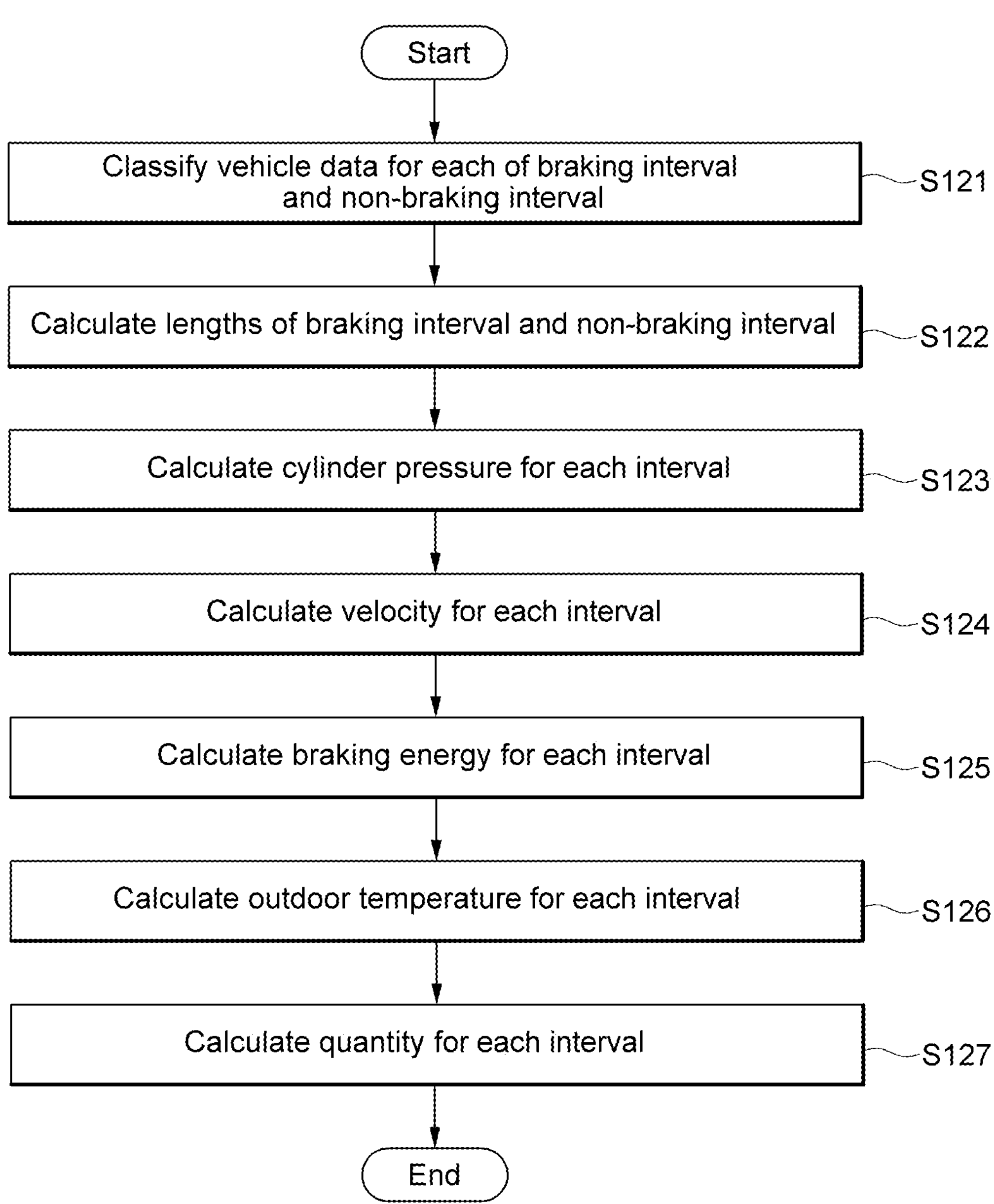
FIG. 23 is a flowchart for describing a step of extracting feature data of FIG. 20 according to an exemplary embodiment of the present disclosure.

FIG. 23 is a flowchart for describing an exemplary embodiment of a step of extracting feature data of FIG. 20.

The step S120 of extracting the feature data in FIG. 20 may include one or more of steps illustrated in FIG. 23.

First, the stored vehicle data for each of the braking interval and the non-braking interval of the vehicle is classified (S121).

Subsequently, the length of the braking interval and the length of the non-braking interval is calculated based on the classified vehicle data (S122).

Next, the pressure for each interval of the cylinder for providing the braking force of the vehicle is calculated based on the classified vehicle data (S123).

Thereafter, the vehicle velocity for each interval is calculated based on the classified vehicle data (S124).

Next, the braking energy for each interval based on the classified vehicle data is calculated (S125).

Subsequently, the outdoor temperature of the vehicle for each interval is calculated based on the classified vehicle data (S126).

Thereafter, the quantity of rain for each interval is calculated based on the classified vehicle data (S127).

Figure 24:
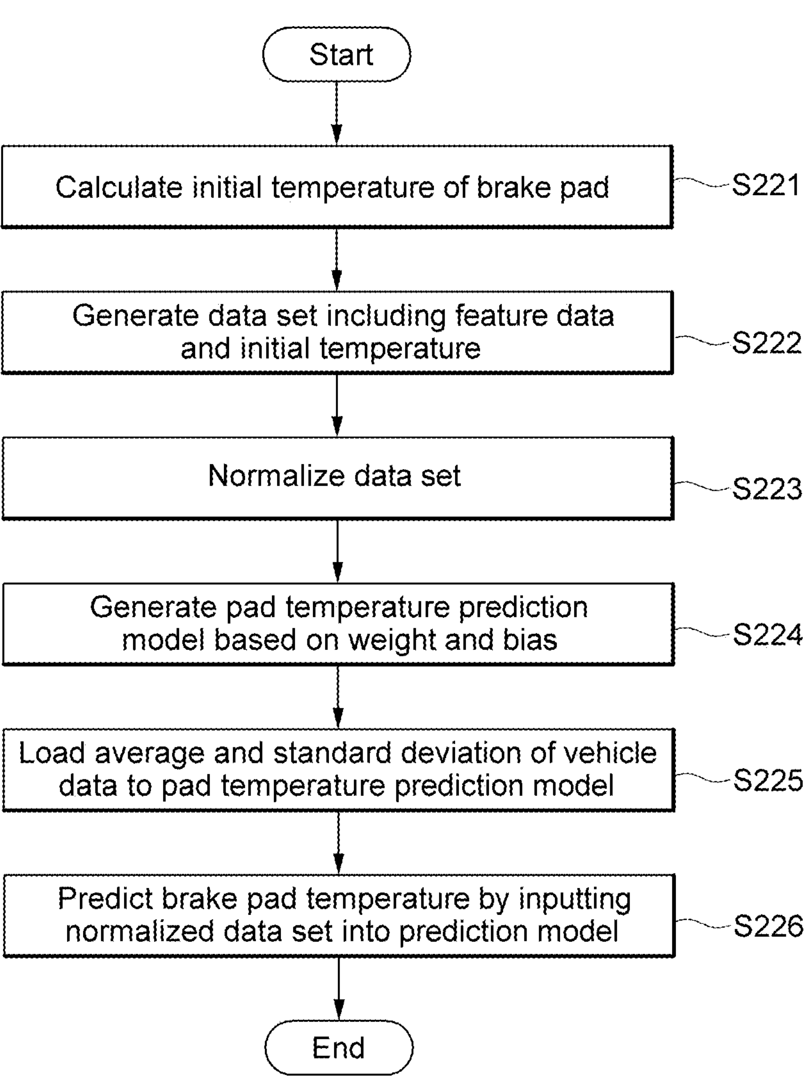
FIG. 24 is a flowchart for describing a method for calculating a temperature of a brake pad of FIG. 21 according to an exemplary embodiment of the present disclosure.

FIG. 24 is a flowchart for describing a step of calculating a temperature of a brake pad of FIG. 21.

The step S220 of calculating the temperature of the brake pad in FIG. 21 may include one or more of steps illustrated in FIG. 24.

First, the initial temperature of the brake pad is calculated based on the extracted feature data (S221).

Thereafter, the extracted feature data and the calculated initial temperature are collected and outputted as one data set (S222).

Next, the data set based on the average and the standard deviation of the stored vehicle data is normalized (S223).

Thereafter, the brake pad temperature prediction model generated based on the weight and the bias of the stored vehicle data (S224).

Next, the average and the standard deviation of the stored vehicle data is loaded to the brake pad temperature prediction model (S225).

Subsequently, the temperature change rate of the brake pad is calculated by inputting the normalized data set into the brake pad temperature prediction model, calculating the temperature of the brake pad by adding the initial temperature to the calculated temperature change rate, and the calculated brake pad temperature is outputted (S226).

Figure 25:
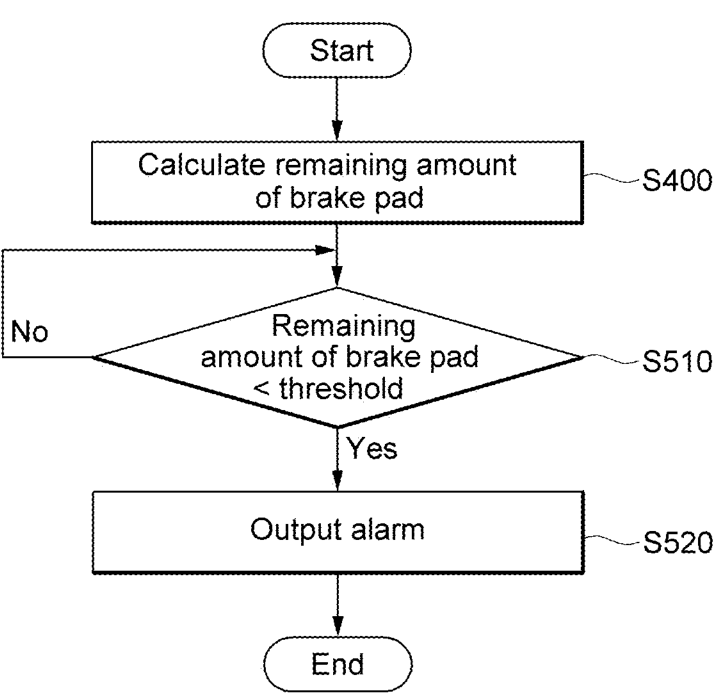
FIG. 25 is a flowchart for describing a step of determining whether to output an alarm depending on a temperature of the brake pad of FIG. 19 according to an exemplary embodiment of the present disclosure.

FIG. 25 is a flowchart for describing an embodiment of determining whether to output an alarm depending on a temperature of a brake pad of FIG. 19.

First, the remaining amount of the brake pad is calculated (S400), and the calculated remaining amount of the brake pad and a predetermined threshold are compared to each other (S510).

Thereafter, when the comparison result of the step S510 is that the remaining amount of the brake pad is smaller than the threshold at the step S510, the alarm is outputted (S520).

However, when the comparison result of the step S510 is that the remaining amount of the brake pad is equal to or larger than the threshold, the step S510 is repeated.

Figure 26:
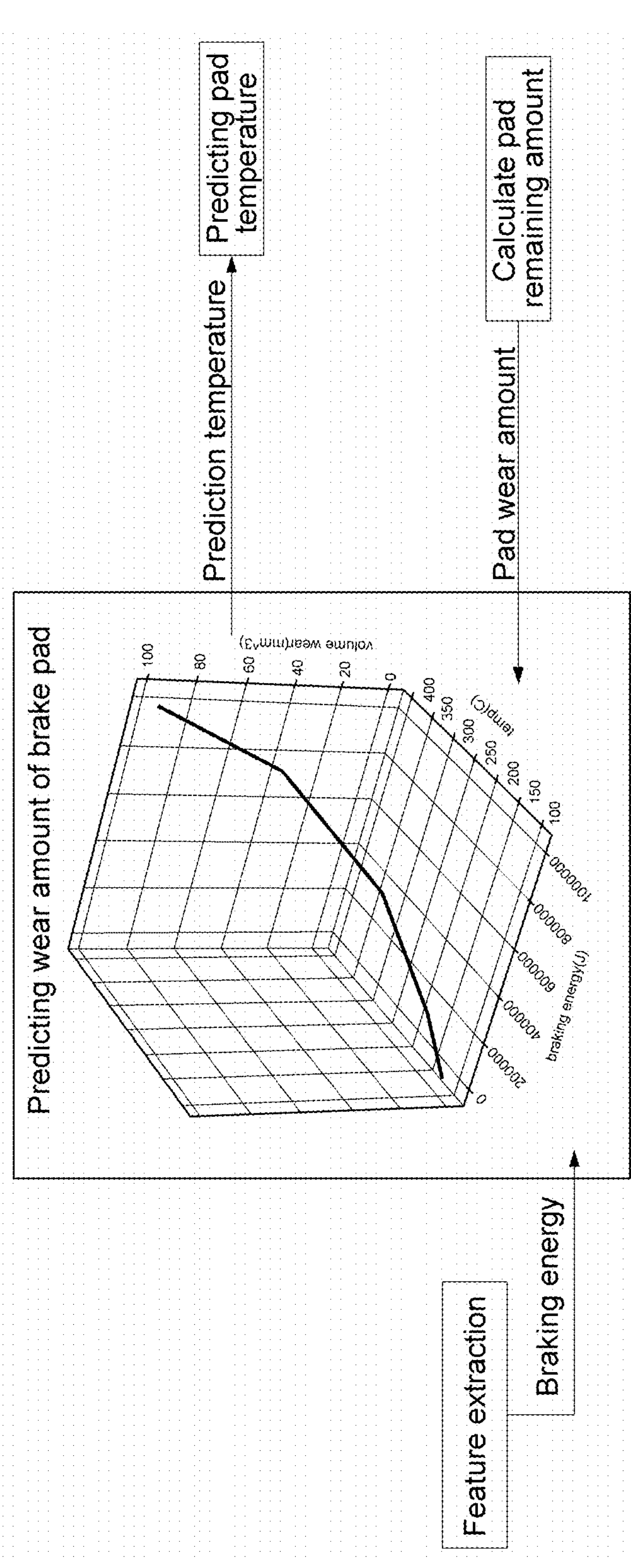
FIG. 26 is a graph for illustrating a pad wear prediction curve calculated by an apparatus and a method for monitoring a brake pad according to an exemplary embodiment of the present disclosure.

FIG. 26 is a graph for illustrating a pad wear prediction curve calculated by the brake pad monitoring apparatus 4000 and a method for monitoring a brake pad according to an exemplary embodiment of the present disclosure.

As illustrated in FIG. 26, when a feature for the vehicle data is extracted, the wear amount of the brake pad may be calculated based on braking energy of the feature (i.e., feature data) and the brake pad temperature predicted by the temperature prediction model.

The remaining amount of the brake pad may be calculated based on the calculated wear amount of the brake pad.

Meanwhile, the vehicle consumables management system 10000 according to an exemplary embodiment of the present disclosure may transmit information on a remaining amount of the consumables (e.g., at least one of the tire and the brake pad) to a display device of the vehicle 3000. As a result, the display device may display the remaining amount of the tire tread and the remaining amount of the brake pad on a screen.

In this case, the vehicle consumables management system 10000 may transmit information on consumables remaining amount through the server 2000 to the vehicle 3000, and unlike this, may also transmit the information on the consumables remaining amount to the display device of the vehicle 3000 and a control unit or controller controlling the display device without passing through the server 2000.

Meanwhile, it will be able to be appreciated that a block of each of the drawings of a processing flowchart and combinations of the drawings can be performed by computer program instructions. Since the computer program instructions may be mounted on a universal computer, a special computer or a processor of other programmable data processing equipment, the instructions performed by the computer or a processor of other programmable data processing equipment generate a means of performing functions described in a block(s) of the flowchart. Since the computer program instructions may also be stored in a computer usable or computer readable memory which may direct a computer or other programmable data processing equipment in order to implement a function in a specific scheme, the instructions stored in the computer usable or computer readable memory can also produce manufacturing items including an instruction means performing a function described in the block(s) of the flowchart. Since the computer program instructions can also be mounted on the computer or other programmable data processing equipment, instructions that perform the computer or other programmable data processing equipment by generating a processor executed by the computer as a series of operational steps are performed on the computer or other programmable data processing equipment can provide steps for executing the functions described in the block(s) of the flowchart.

Further, each block may represent a part of a module, a segment, or a code that includes one or more executable instructions for executing a specified logical function(s). It should also be noted that in some alternative embodiments, the functions mentioned in the blocks may occur out of order. For example, two successive illustrated blocks may in fact be performed substantially concurrently and the blocks may sometimes be performed in reverse order according to the corresponding function.

In this case, the term "unit" used in the exemplary embodiment means software and hardware components such as one or more processors or controller, FPGA or ASIC and the "unit" performs predetermined roles. However, the "unit" is not a meaning limited to software or hardware. The "unit" may be configured to reside on an addressable storage medium and may be configured to reproduce one or more processors. Accordingly, as one example, the "unit" includes components such as software components, object oriented software components, class components, and task components, processes, functions, attributes, procedures, subroutines, segments of a program code, drivers, firmware, microcodes, circuitry, data, databases, data structures, tables, arrays, and variables. Functions provided in the components and the "units" may be combined into a smaller number of components and "units" or further separated into additional components and "units". Moreover, the components and the 'units' may be implemented to reproduce one or more CPUs in a device or a secure multimedia card.

It will be appreciated that those skilled in the art that the present specification belongs to the technical field of the technical field may be practiced in other specific forms without changing the technical spirit or essential features. Therefore, it should be appreciated that the aforementioned embodiments are illustrative in all aspects and are not restricted. The scope of the present disclosure is represented by claims to be described below rather than the detailed description, and it is to be interpreted that the meaning and scope of the claims and all the changes or modified forms derived from the equivalents thereof come within the scope of the present disclosure.

Meanwhile, preferred embodiments of the present disclosure have been disclosed in the present disclosure and the drawing and although specific terminologies are used, but they are used in a general meaning for easily describe the technical content of the present disclosure and help understanding the present disclosure and are not limited to the scope of the present disclosure. In addition to the embodiments disclosed herein, it is apparent to those skilled in the art that other modified examples based on the technical spirit of the present disclosure can be executed.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicle consumables management system comprising one or more processors configured to:

receive vehicle data including a driving distance, a wheel pulse signal, tire pressure and weight of a vehicle;

calculate a wheel speed from the wheel pulse signal and compute a wheel slip rate based on the wheel speed;

retrieve a corrected dynamic radius from a lookup table indexed by the tire pressure and the vehicle weight;

correct the wheel speed using the slip rate and the corrected dynamic radius; and calculate, based on the corrected wheel speed and the driving distance, a dynamic radius of a tire and a remaining amount of a tread, and when the remaining amount of the tread of the tire is below a threshold, output an alarm.

2. The vehicle consumables management system of claim 1, wherein the one or more processors are configured to:

calculate the remaining amount of the tread of the tire based on the calculated dynamic radius.

3. The vehicle consumables management system of claim 1, wherein the one or more processors are configured to calculate the remaining amount of the tread of the tire based on a ratio of the driving distance to the corrected wheel speed or a ratio of the corrected wheel speed to the driving distance.

4. The vehicle consumables management system of claim 1, wherein the one or more processors are configured to:

calculate the driving distance based on positional data of the vehicle.

5. The vehicle consumables management system of claim 4, wherein the one or more processors are configured to calculate the driving distance of the vehicle based on the positional data of the vehicle and map data.

6. The vehicle consumables management system of claim 1, wherein the one or more processors are configured to calculate an expected replacement date of the tire based on information on tire replacement history and the remaining amount of the tread of the tire.

* * * * *